US009804767B2

(12) United States Patent
Layne, Jr. et al.

(10) Patent No.: US 9,804,767 B2
(45) Date of Patent: Oct. 31, 2017

(54) LIGHT DISMISS MANAGER

(71) Applicant: MICROSOFT TECHNOLOGY LICENSING, LLC, Redmond, WA (US)

(72) Inventors: Edward Layne, Jr., Seattle, WA (US); Il Yeo, Bellevue, WA (US); Timothy Long, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 13 days.

(21) Appl. No.: 14/746,817

(22) Filed: Jun. 22, 2015

(65) Prior Publication Data
US 2015/0378549 A1 Dec. 31, 2015

Related U.S. Application Data

(60) Provisional application No. 62/018,473, filed on Jun. 27, 2014.

(51) Int. Cl.
*G06F 3/041* (2006.01)
*G06F 3/0488* (2013.01)
(Continued)

(52) U.S. Cl.
CPC .......... *G06F 3/0488* (2013.01); *G06F 3/0481* (2013.01); *G06F 9/542* (2013.01); *G09G 5/14* (2013.01); *G06F 2203/04804* (2013.01)

(58) Field of Classification Search
None
See application file for complete search history.

(56) References Cited

U.S. PATENT DOCUMENTS 5,485,175 A 1/1996 Suzuki
5,689,668 A 11/1997 Beaudet et al.
(Continued)

FOREIGN PATENT DOCUMENTS

EP   2230590 A2   9/2010
WO   2010125419 A1   11/2010

OTHER PUBLICATIONS

Francone, et al., "Wavelet Menus: A Stacking Metaphor for Adapting Marking Menus to Mobile Devices", In Proceedings of the 11th International Conference on Human-Computer Interaction with Mobile Devices and Services, Sep. 15, 2009, 4 pages.

(Continued)

*Primary Examiner* — Joseph Haley
(74) *Attorney, Agent, or Firm* — Jeffrey L. Ranck; Ranck IP Law

(57) ABSTRACT

A computing device may instantiate a light dismiss manager for an application user interface. The light dismiss manager receives a request to register an event pass area from a rendered user interface surface of the application user interface and receives a notification that a new light dismiss user interface surface is to be opened in the application user interface. The light dismiss manager determines a shape of a transparent blocking panel that excludes the event pass area. When the new light dismiss user interface surface is opened in the application user interface, the transparent blocking panel is rendered below the new light dismiss user interface surface. In response to an input event directed to a visible portion of the rendered user interface surface, the new light dismiss user interface is closed, and a command associated with the visible portion of the rendered user interface surface is executed.

20 Claims, 15 Drawing Sheets

(51) Int. Cl.
*G06F 9/54* (2006.01)
*G06F 3/0481* (2013.01)
*G09G 5/14* (2006.01)

(56) References Cited

U.S. PATENT DOCUMENTS

| | | | |
|---|---|---|---|
| 6,118,451 | A | 9/2000 | Alexander |
| 6,128,012 | A | 10/2000 | Seidensticker et al. |
| 6,583,798 | B1 | 6/2003 | Hoek et al. |
| 7,418,670 | B2 | 8/2008 | Goldsmith |
| 7,533,352 | B2 | 5/2009 | Chew et al. |
| 7,895,531 | B2 | 2/2011 | Radtke et al. |
| 8,321,802 | B2 | 11/2012 | Rogers |
| 8,572,509 | B2 | 10/2013 | Gobeil |
| 2011/0087989 | A1* | 4/2011 | McCann ............ G06F 3/04817 715/772 |
| 2011/0271229 | A1 | 11/2011 | Yu |
| 2012/0272144 | A1 | 10/2012 | Radakovitz et al. |
| 2013/0019172 | A1 | 1/2013 | Kotler et al. |
| 2013/0019173 | A1 | 1/2013 | Kotler et al. |
| 2013/0019175 | A1 | 1/2013 | Kotler et al. |
| 2013/0019182 | A1 | 1/2013 | Gil et al. |
| 2014/0164955 | A1 | 6/2014 | Thiruvidam et al. |
| 2015/0186351 | A1* | 7/2015 | Hicks ................... G06F 17/241 715/232 |

OTHER PUBLICATIONS

"Dynamic pop up menu", Retrieved from <<http://doc.4d.com/4D-Language-Reference-12.4/Menus/Dynamic-pop-up-menu.301-977945.en.html>>on Jul. 7, 2014, 1 page.

Devexpress, "Editor Control for WinForms", Retrieved from <<https://www.devexpress.com/Products/NET/Controls/WinForms/Rich_Editor/whatsnew.xml?page=7 >> on Jul. 1, 2014, 5 pages.

Rice, Frank, "Customizing Context Menus in Office 2010", Retrieved from http://msdn.microsoft.com/en-us/library/ee691832(v=office.14).aspx>>, Published: Nov. 2009, 7 pages.

"Demo for Java GlassPane",, Nov. 15, 2011 (Nov. 15, 2011), XPO55245566, Retrieved from the Internet: URL:https://web.archive.org/web/20111115103842/http://docs.oracle.com/javase/tutorial/uiswing/examples/components/GlassPaneDemoProjects/src/components/GlassPaneDemo.java [retrieved on Feb. 7, 2017].

"How Modal Windows Work",,Nov. 27, 2009 (Nov. 27, 2009), XPO55245578, Retrieved from the Internet: URL: https://developer.apple.com/library/mac/documentation/Cocoa/Conceptual/WinPanel/Concepts/UsingModalWindows.html#//apple_ref/doc/uid/20000223 [retrieved on Feb. 7, 2017].

International Search Report and the Written Opinion of the International Searching Authority, or the Declaration dated Sep. 25, 2015 regarding International Application No. PCT/US2015/037666. 17 pages.

International Preliminary Report on Patentability dated Oct. 11, 2016 regarding International Application No. PCT/US2015/037666. 30 pages.

Dana Moore et al: "Professional Rich Internet Applications: AJAX and Beyond" Jan. 1, 2007 (Jan. 1, 2007), Wiley Publishing, Inc, XP055245589, ISSN 1836-0203. pp. 377-387.

\* cited by examiner

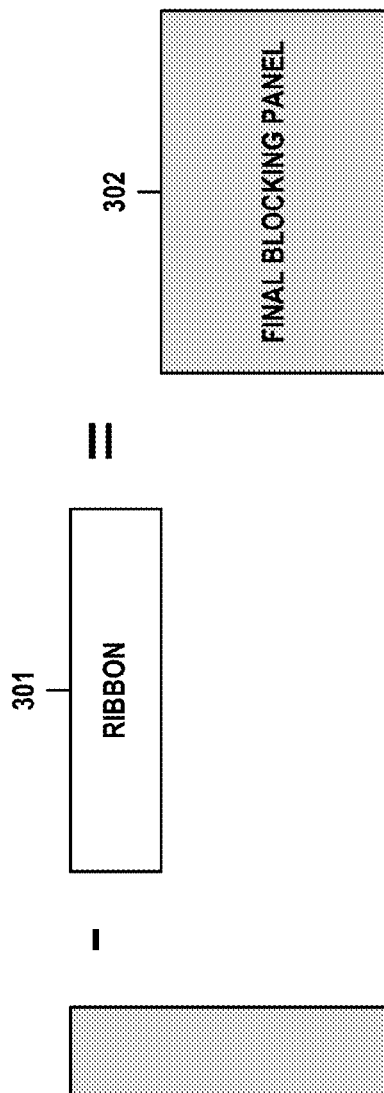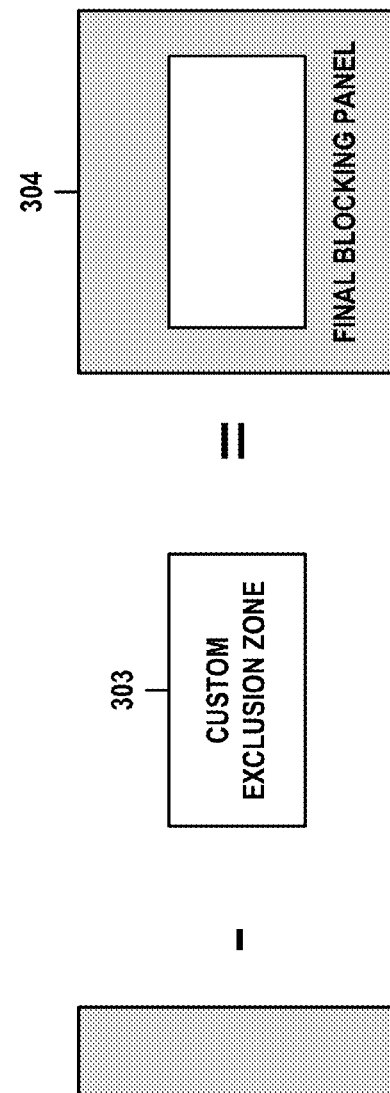

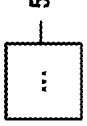
FIG. 5A

FIG. 5C

Australia
By: Jane Doe

The first 200 years of non-indigenous occupation of Australia forged a new nation built on the oppression and mistreatment of the indigenous people of this nation. Three key events, the initial colonization of Australia, the assimilation of the indigenous people as well as the as the governmental policies enforced will be discussed in detail along with their current impacts.

HISTORY

European Settlers in Australia

The initial interactions between the first European settlers and the indigenous people of Australia shaped the framework for which all other interactions were based and have has a dramatic and lasting impact on the course of events that has led to how Australia is today. The first contact initial contact set td for racism and violence which continued for decades. Indigenous people were denied the right of basic human beings and their land was stolen from them by the European settlers. People from several countries went to Australia, including England
Sweden
Denmark Screens 1-2 of 6

FIG. 5D

LIGHT DISMISS MANAGER

CROSS-REFERENCE TO RELATED APPLICATIONS

This patent application claims priority to U.S. provisional patent application Ser. No. 62/018,473 titled "LIGHT DISMISS MANAGER" which was filed on Jun. 27, 2014 and which is expressly incorporated herein by reference in its entirety.

BACKGROUND

Accidental invocation of an on-screen element has a potentially high cost of recovery for touchscreen applications. When a pop-up user interface is displayed, some touchscreen applications require an extra tap or click to dismiss the pop-up user interface before the user can interact with other on screen elements. This behavior may provide users with a higher sense of comfort knowing that a tap anywhere outside of the pop-up user interface will only dismiss the pop-up user interface without having to consider what action could be executed by the tap. However, this behavior can also frustrate users by making an on-screen element appear to be broken since a command associated with the on-screen element is not executed.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computing device can be configured to manage light dismiss behavior in an application user interface. The computing device can instantiate a light dismiss manager for the application user interface. The light dismiss manager receives a request to register an event pass area from a rendered user interface surface of the application user interface and receives a notification that a new light dismiss user interface surface is to be opened in the application user interface. The light dismiss manager determines a shape of a transparent blocking panel that excludes the event pass area. When the new light dismiss user interface surface is opened in the application user interface, the transparent blocking panel is rendered below the new light dismiss user interface surface. In response to an input event directed to a visible portion of the rendered user interface surface, the new light dismiss user interface is closed, and a command associated with the visible portion of the rendered user interface surface is executed.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIGS. 3A and 3B illustrate exemplary blocking panel implementations in accordance with aspects of the described subject matter.

FIGS. 4A-E illustrate exemplary implementations of light dismiss behavior in accordance with aspects of the described subject matter.

FIGS. 5A-D illustrate exemplary implementations of light dismiss behavior in accordance with aspects of the described subject matter.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1:
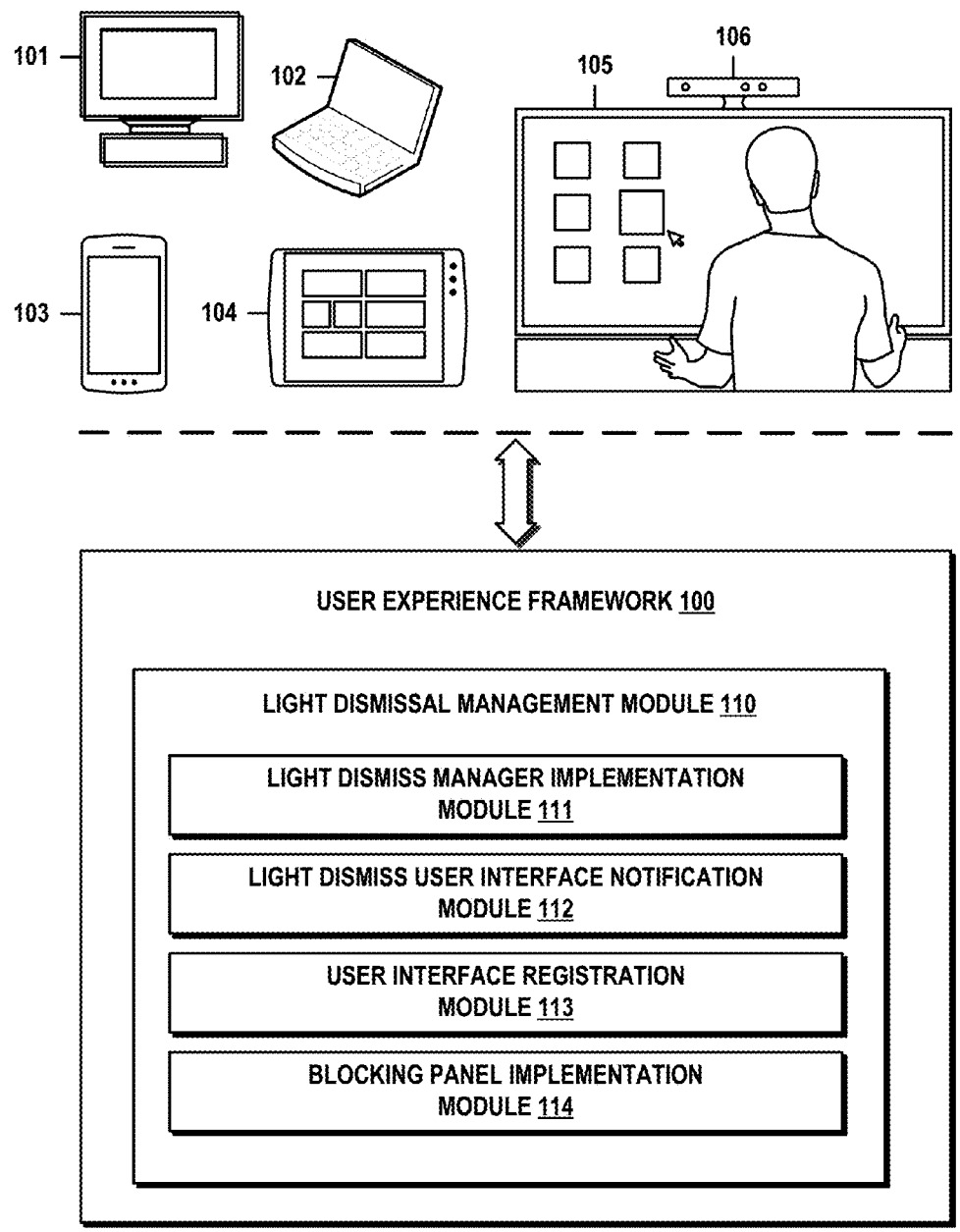
FIG. 1 illustrates as an embodiment of an exemplary architecture in accordance with aspects of the described subject matter.

FIG. 1 illustrates a user experience framework 100 as an embodiment of an exemplary architecture in accordance with the described subject matter. It is to be appreciated that user experience framework 100, or portions thereof, can be implemented by various computing devices and can be implemented by software, hardware, firmware or a combination thereof in various embodiments.

Implementations of user experience framework 100 are described in the context of a computing device and/or a computer system configured to perform various steps, methods, and/or functionality in accordance with aspects of the described subject matter. It is to be appreciated that a computer system can be implemented by one or more computing devices. Implementations of user experience framework 100 also are described in the context of "computer-executable instructions" that are executed to perform various steps, methods, and/or functionality in accordance with aspects of the described subject matter.

In general, a computing device and/or computer system can include one or more processors and storage devices (e.g., memory and disk drives) as well as various input devices, output devices, communication interfaces, and/or other types of devices. A computing device and/or computer system also can include a combination of hardware and software. It can be appreciated that various types of computer-readable storage media can be part of a computing device and/or computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computing device and/or computer system can include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions can be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions can be stored on one or more computer-readable storage media and can be executed by one or more processors, computing devices, and/or computer systems to perform particular tasks or implement particular data types in accordance with aspects of the described subject matter.

User experience framework 100 can be implemented by one or more computing devices, such as client devices 101-106. Client device 101 is shown as a personal computer (PC). Client device 102 is shown as a laptop computer. Client device 103 is shown as a smartphone. Client device 104 is shown as a tablet device. Client device 105 and client device 106 are shown as a television and a media device (e.g., media and/or gaming console, set-top box, etc.). It is to be understood that the number and types of client devices 101-106 are provided for purposes of illustration. User experience framework 100 also can be implemented by one or more computing devices of a computer system configured to provide server-hosted, cloud-based, and/or online services in accordance with aspects of the described subject matter.

In implementations where user-related data is utilized, user experience framework 100 and/or computing devices (e.g., client devices 101-106, computing devices of a computer system, etc.) that provide and/or support user experience framework 100 can employ a variety of mechanisms in the interests of user privacy and information protection. Such mechanisms can include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

As shown, user experience framework 100 can be implemented by one or more computer program modules configured for: light dismissal management, light dismiss manager implementation, user interface registration, light dismiss user interface notification, and blocking panel implementation. Computer program modules of user experience framework 100 can be implemented by computer-executable instructions that are stored on one or more computer-readable storage media and that are executed to perform various steps, methods, and/or functionality in accordance with aspects of the described subject matter. While such computer program modules are shown in block diagram form to describe certain functionality, it is to be understood that the functionality performed by a single computer program module may be performed by multiple computer program modules and that a single computer program module may be configured to perform functionality described as being performed by multiple computer program modules.

In some scenarios, when a certain type of user interface (UI) surface is presented to a user, an application may require the user to explicitly dismiss the UI surface from the screen by clicking an "X" or "Close" button. However, for various applications where touch is a primary mode of interface, it is often preferable to "light dismiss" certain UI surfaces from the screen whenever the user takes an action outside of the bounds of a given UI surface in many scenarios.

Light dismissal management module 110 can be configured to provide applications with the ability to customize light dismiss behavior for various scenarios and/or enable consistent light dismiss behavior across various applications. Light dismiss behavior can be controlled for various UI surfaces including, without limitation: on-object UIs, command surfaces, controls, flyouts, callouts, panes, boxes, ribbons, menu surfaces, pop-ups, pop-overs, and the like. Light dismiss management can be implemented for UI surfaces that are responsive various types of user input including, without limitation: touch input (e.g., taps, swipes, gestures, etc.), mouse input, keyboard (physical or virtual) input, pen input, and/or other types of user input in accordance with the described subject matter.

Light dismiss manager implementation module 111 can be configured to implement a light dismiss manager for an application user interface. For a particular application, the light dismiss manager and/or parts thereof can be implemented to control light dismiss behavior of the UI surfaces provided by the application. It can be appreciated that different UI surfaces can implement light dismiss behavior in a variety of ways. As such, the light dismiss manager can be designed as a centralized control that manages various scenarios around light dismiss behavior. For instance, the light dismiss manager can be configured to support scenarios that implement multiple light dismiss UI surfaces to maintain consistent behavior across multiple light dismiss UI surfaces (e.g., on-object UIs, command surfaces, controls, etc.).

A light dismiss manager can be implemented for various applications including, but not limited to: word processing applications, spreadsheet applications, slideshow presentation applications, note taking applications, email applications, text messaging applications, and other types of applications that enable users to select, author, and/or edit content. As such, an application can determine and/or decide how clicks and/or taps are to be handled and can employ the light dismiss manager to effectuate desired light dismiss behavior. The light dismiss manager can be utilized by user interfaces provided on desktop, touchscreen, and/or mobile devices and can be implemented across various form factors, architectures, and/or applications.

In one embodiment, an instance of a light dismiss manager class can be instantiated or aligned as a light dismiss manager object implemented as a per window object, such as a main window object (e.g., CoreWindow object) or the like. The light dismiss manager class can be separated and/or independent from the main window (e.g., CoreWindow) such that the main window can be retrieved inside a global exported function and can be passed in as constructor parameter to the light dismiss manager class. The main window can be retrieved through a static method allowing a light dismiss manager instance to retrieved inside light dismiss UI surfaces. In some implementations, the light dismiss manager object can be a singleton object of the light dismiss manager class that is instantiated on first use and is guaranteed to be destroyed.

In another embodiment, the light dismiss manager object can be implemented as a per application frame user interface (e.g., AppFrameUI) object. An instance of a light dismiss UI surface can be given a reference to the light dismiss manager which can be passed along the Extensible Application Markup Language (XAML) tree. Such approach can provide benefits by breaking or loosening the coupling between light dismiss UI surfaces and the light dismiss manager, which can result in better components and be easier to use by a test framework.

The light dismiss manager object can rely on a static window object from which a root visual element is retrieved and used to reference bounds and coordinates for light dismiss behavior. The light dismiss manager object (e.g., per window object, per application frame UI object) can have a 1:1 mapping with the window object. As such, there can be multiple light dismiss manager instances in scenarios where there are multiple windows. In other embodiments, the light dismiss manager object can be implemented as a global object, for example, in scenarios that rely on a single window and thus one root element.

While the light dismiss manager can be instantiated per window object, the embodiments are not limited to this context. For example, there may be scenarios having multiple window instances or objects in containment relation, such as where an e-mail application embeds a word processing application. According, the light dismiss manager can be implemented to address such scenarios so that only one instance of the light dismiss manager is instantiated.

An application that employs one or more light dismiss UI surfaces can implement code to retrieve an instance of the light dismiss manager. In one implementation, the light dismiss manager can be retrieved by calling a method such as global method (e.g., GetLightDissmissManager). The method can be defined and/or operate to retrieve (e.g., via a GET method) an instance of a current main application window (e.g., a core window) for a current thread and retrieve (e.g., via a GET method) an instance of the light dismiss manager class. The method can be defined and/or operate to request a light dismiss manager object per main application window object (e.g., core window object). The light dismiss manager can be returned if found from the current main application window. For example, the current main application window can contain a reference or key which can be used to look up the light dismiss manager. If the light dismiss manager is not found or does not exist, an instance of the light dismiss manager can be created.

Light dismiss user interface notification module 112 can be configured to receive and send notifications to light dismiss UI surfaces. When a new and/or child light dismiss UI surface (parented by and/or anchored to an existing light dismiss UI surface) is about to appear, a notification can be received so that an appropriate dismiss mechanism can be prepared for the new and/or child light dismiss UI surface. When a dismiss event is detected, a notification can be sent to one or more active light dismiss UI surfaces (e.g., the opened new and/or child light dismiss UI surface, active light dismiss UI surfaces that are not anchored to the new and/or child light dismiss UI surface) indicating whether dismiss event should or is going to result in dismissal.

The light dismiss manager can define a set of event types corresponding to events that can dismiss or close an active (e.g., currently visible, opened) light dismiss UI surface. One dismiss event can be when a new light dismiss UI surface, which is not a child of an active light dismiss UI surface, is about to open (e.g., OtherSurfaceAboutToShow). For example, in some implementations, only one active light dismiss UI surface is permitted to be active at one time unless separate light dismiss UI surfaces are in parent-child relation. As such, creating a new light dismiss UI surface that is not a child light dismiss UI surface can dismiss an existing light dismiss UI surface.

Another dismiss event can be when a tap or click (e.g., PointerPressed) has been detected outside of the bounds of an active light dismiss UI surface or the bounds of anchored active light dismiss UI surfaces. A tap or click outside the bounds of an active light dismiss UI surface that is not anchored to a child light dismiss UI surface will dismiss the active light dismiss UI surface. When a child light dismiss UI surface is anchored to a parent light dismiss UI surface, a tap or click outside the bounds of the light dismiss UI surface tree will dismiss the parent light dismiss UI surface and the child light dismiss UI surface together.

Another dismiss event can be when an escape (Esc) key has been pressed (e.g., EscapeKeyPressed). In some implementations, pressing the escape key will dismiss an active light dismiss UI surface if the active light dismiss UI surface has focus. For example, if a user brings up a light dismiss pane and then invokes a color picker callout from that pane, pressing the escape key can dismiss the color picker callout, and pressing the escape key a second time can dismiss the light dismiss pane.

Another dismiss event can be when the application has been deactivated (e.g., AppDeactivated). Another dismiss event can be when the window size has been changed (e.g., WindowSizeChanged). In some implementations, all present light dismiss UI surfaces can be dismissed when the application loses focus (e.g., via Alt-tab, Snapped-View, Charms invocation, Edgy, and/or other OS level command), when the window is resized, and/or entry into backstage.

The light dismiss manager also can define dismiss event arguments for various event types (e.g., pane open and close events). The event arguments can specify the event type and whether a light dismiss UI surface is actually dismissed or going to be dismissed due to the event.

The light dismiss manager can be configured to listen for dismiss events (e.g., other light dismiss UI about to open, click or tap outside of the bounds of an active light dismiss UI surface, escape key pressed, application deactivated, window size changed, etc.). In some implementations, the main application window can specify an interface (e.g., ICoreWindow) for a window object and input events as well as user interface behaviors. As such, XAML components can receive a user's input event. In such implementations, the light dismiss manager can listen to the input events such as a pointer pressed event (e.g., ICoreWindow's PointerPressed event) that detects taps, clicks, and gestures (e.g., pinch, swipe, etc.). The light dismiss manager can implement logic for determining whether a click or touch point falls within or outside of an active light dismiss UI surface.

User interface registration module 113 can be configured to receive requests to register event pass areas where clicks and/or taps will be executed when a light dismiss UI surface is visible. An application, application user interface, and/or application user interface surface can register exclusion areas or event pass areas with the light dismiss manager so that certain user interface surfaces that are visible when an active light dismiss UI surface is present will receive and execute an input event that also serves to dismiss one or more active light dismiss UI surfaces. As such, an application can determine and/or decide how clicks and/or taps are to be handled and can employ the light dismiss manager to effectuate desired light dismiss behavior. Passing clicks and/or taps into a ribbon or pane for execution while an active light dismiss UI surface is present is an example of such a scenario.

Blocking panel implementation module 114 can be configured to determine the shape of a blocking panel that excludes event pass areas and that is to be rendered below an active light dismiss UI surface. In one embodiment, the default light dismiss behavior can be implemented by a blocking panel that ingests or "eats" input event to UI (e.g., XAML) surfaces when a light dismiss UI surface is displayed. Initially, the blocking panel can be implemented as full-screen, transparent UI surface (e.g., rectangle) that spans the entire application window behind the active light dismiss UI surface. The blocking panel will not affect the main application window interface (e.g., ICoreWindow) so that input events still will be received and detected by the light dismiss manager. User input events directed to the blocking panel will be received to dismiss an active light dismiss UI surface. The blocking panel also will not affect input events directed to an active light dismiss UI surface that overlays the blocking panel.

Various UI surfaces can define exclusion areas where the blocking panel does not block and/or is not implemented so that user input events pass through such areas for execution. Typically, an exclusion area or event pass area may correspond to the surface area of a UI surface that is entirely visible and not occluded in any way by the display of the active light dismiss UI surface. In some cases, however, an exclusion area or event pass area can correspond to the surface area of a portion of UI surface that is visible and not occluded by the display of the active light dismiss UI surface.

The light dismiss manager can provide an application with the ability and flexibility to customize light dismiss behavior for various scenarios (e.g., use cases, modes, etc.) and/or enable consistent light dismiss behavior across various applications.

The light dismiss manager can manage light dismiss behavior such that: if no active light dismiss UI surface is present, any tap or click on a given visible UI surface will pass through to an application and will be immediately executed. The light dismiss manager can manage light dismiss behavior such that: if an active light dismiss UI surface (e.g., callout from canvas) is present: clicks and/or taps in certain areas (e.g., registered exclusion/event pass areas) will dismiss any active light dismiss UI surface and will pass through to the application for execution. The light dismiss manager can manage light dismiss behavior such that: if an active light dismiss UI surface is present: clicks and/or taps in other areas (e.g., UI surfaces not registered as exclusion/event pass areas) will dismiss any active light dismiss UI surface but will not pass through to the application for execution.

The light dismiss manager can manage light dismiss behavior such that: if an active light dismiss UI surface is present: (i) any tap or click into a ribbon or a pane (e.g., chrome of the application and/or window) will always pass through to the ribbon or pane and will be immediately executed; (ii) the tap and/or click also will also dismiss any present light dismiss UI surface unless the user's action was inside the light dismiss UI surface; (iii) a click and/or tap into the canvas will dismiss the active light dismiss UI surface; (iv) the click and/or tap into the canvas will dismiss the active light dismiss UI surface but will be ingested or eaten so that the click and/or tap does not pass through to the application for execution; and a click and/or tap into the canvas that is made subsequent to a click and/or tap into the canvas that dismisses the active light dismiss UI surface will pass through to the application for execution.

The light dismiss manager can manage light dismiss behavior such that: if a light dismiss UI surface is anchored to another light dismiss UI surface (e.g. floating menu bar with open submenu open, light dismiss pane with a callout): (i) any tap and/or click into the canvas will dismiss both light dismiss UI surfaces together; (ii) the tap and/or click into the canvas will be ingested or eaten so that the click and/or tap does not pass through to the application for execution; and (iii) any tap or click into a ribbon or pane will always pass through to the application for execution.

The light dismiss manager can manage light dismiss behavior such that: when an active light dismiss UI surface is presented while an application is in a certain mode (e.g., reading mode, slideshow mode), any click or tap click will dismiss any active light dismiss UI surfaces and will always pass through to a ribbon, a pane, or the canvas.

The light dismiss manager can manage light dismiss behavior such that: if a pop-over ribbon is present without any active light dismiss UI surface being present: (i) all taps and/or clicks will execute; and (ii) a tap and/or click outside of the pop-up ribbon will dismiss the pop-over ribbon.

The light dismiss manager can manage light dismiss behavior such that: if a pop-over ribbon is present with an active light dismiss UI surface being present (e.g. pop-over ribbon submenu): (i) any click and/or tap into the pop-up ribbon will be executed and will dismiss any active light dismiss UI surface; and (ii) a tap and/or click outside of the pop-up ribbon will dismiss the pop-over ribbon and any active light dismiss UI surface. In one implementation, a click and/or tap outside of the pop-up ribbon (e.g., into the canvas) will be executed. In another implementation, a click and/or tap into the canvas will be ingested or eaten so that the click and/or tap is not executed.

The light dismiss manager and/or parts thereof can be implemented by or for an application that operates in various modes (e.g., reading mode, editing mode, slideshow mode) or orientations (e.g., portrait view, landscape view, a 50/50 view) and can be designed to provide consistent light dismiss functionality and/or behavior in multiple modes and/or multiple orientations. The light dismiss manager and/or parts thereof can be implemented by or for an application that operates across various touchscreen devices (e.g., desktop, laptop, tablet, mobile phone), form factors, and/or input types and can be designed to provide consistent light dismiss functionality and/or behavior across multiple touchscreen devices, multiple form factors, and/or multiple input types. The light dismiss manager and/or parts thereof can be implemented by or for an application that operates across various operating systems (e.g., a Microsoft® Windows® operating system, a Google® Android™ operating system, an Apple iOS™ operating system) and can be designed to provide consistent light dismiss functionality and/or behavior across multiple operating systems. The light dismiss manager and/or parts thereof can be implemented by or for different applications that employ light dismiss UI surfaces and can be designed to provide consistent light dismiss functionality and/or behavior across different applications.

The light dismiss manager can advantageously provide a consistent, understandable user experience so that users can be confident of receiving a desired response when transient, light dismiss UI surfaces are presented. The light dismiss manager also can provide a consistent user experience within an application, across various UI surface types, across various input types, and across various applications. Additionally, the light dismiss manager can manage light dismissal behavior to minimize the number of clicks or taps required to complete an action while minimizing accidental invocation of on-screen elements so that user feel safe and comfortable when providing touch input to an application. The light dismiss manager also can maintain user efficiency by enabling consistent functionality and/or behavior across desktop and mobile implementations. The light dismiss manager also can allow a user to browse a ribbon and execute a command in the ribbon via a single click or tap, instead of required an extra intermediate tap to dismiss an open callout.

The following exemplary embodiments, implementations, examples, and scenarios are provided to further illustrate aspects the described subject matter. It is to be understood that the following exemplary embodiments, implementations, examples, and scenarios are provided for purposes of illustration and not limitation.

Exemplary Light Dismiss Manager Communication

Figure 2A:
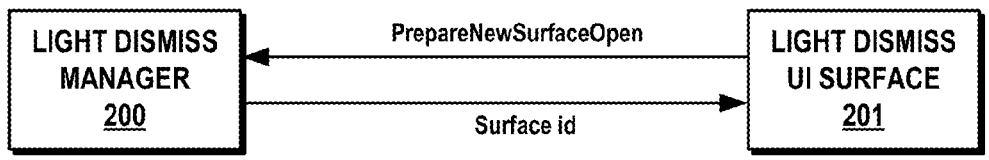
FIGS. 2A-C illustrate exemplary communication between a light dismiss manager and various user interface surfaces in accordance with aspects of the described subject matter.
Figure 2B:
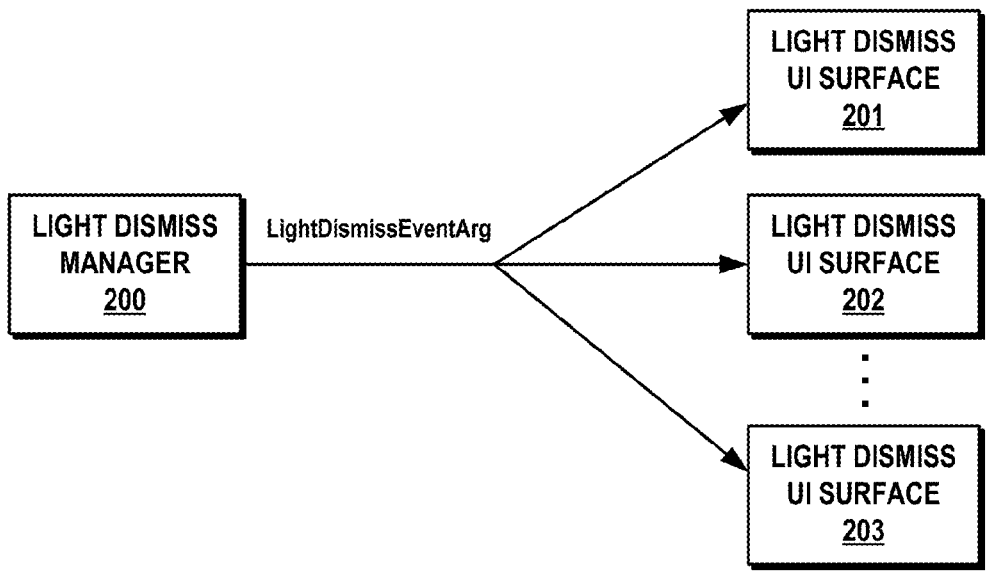
Figure 2C:
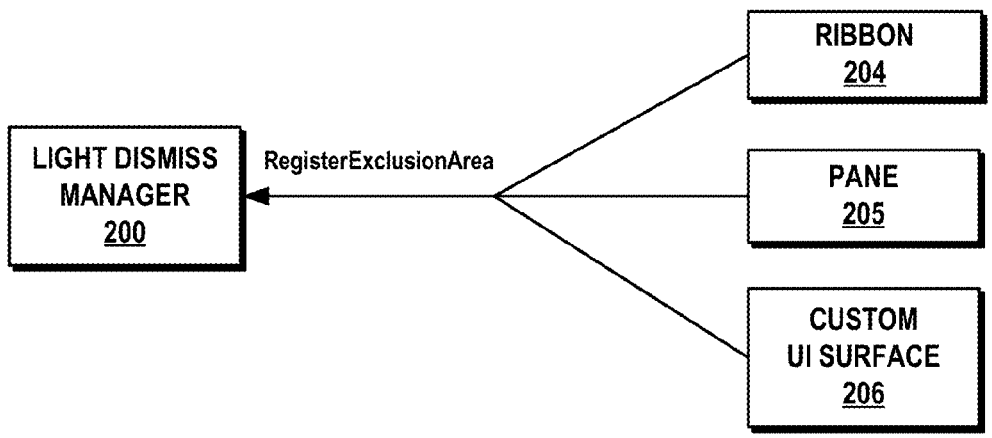

FIGS. 2A-C illustrate exemplary communication between a light dismiss manager 200 and various user interface surfaces in accordance with aspects of the described subject matter. Light dismiss manager 200 can be an example of a light dismiss manager implemented by user experience framework 100, light dismissal management module 110, and/or light dismiss manager implementation module 111. Light dismiss manager 200 can include and/or expose an application programming interface (API) for communicating with various user interface surfaces provided by an application and/or application user interface.

Referring to FIG. 2A, light dismiss manager 200 can communicate with a new light dismiss UI surface 201 that is to be opened in an application user interface. Light dismiss manager 200 can expose an API that includes a method that is called when new light dismiss UI surface 201 is about to appear. The API also can include a method to be called when a child light dismiss UI surface (parented by and/or anchored to an existing light dismiss UI surface) is about to appear. Each of these method can be called by a light dismiss UI surface before the light dismiss UI surface gets opened to notify light dismiss manager 200 to prepare an appropriate dismiss mechanism. Light dismiss manager 200 can receive a surface area parameter from a calling light dismiss UI surface that can be used by light dismiss manager 200 to determine whether a click or touch point falls outside of the bounds of an active light dismiss UI surface or parent-child light dismiss UI surfaces. When each of these methods is called, light dismiss manager 200 can provide the calling light dismiss UI surface with a surface identifier.

Referring to FIG. 2B, light dismiss manager 200 can communicate with one or more active light dismiss UI surfaces 201-203. Each of the methods to be called when a new light dismiss UI surface is about to open can include a callback function. The callback function can be invoked by light dismiss manager 200 when light dismiss manager 200 detects a dismiss event. Event arguments can be passed from light dismiss manager 200 to an active light dismiss UI surface as a parameter for the callback function. The API also can include another method that can be called by a light dismiss UI surface when the control gets released so that no further callback will be invoked.

When a dismiss event occurs, light dismiss manager 200 can invoke the callback function with dismiss arguments to notify active light dismiss UI surfaces 201-203 of whether the dismiss event should or is going to result in dismissal. In some implementations, an active light dismiss UI surface can dismiss itself upon receiving a notification (e.g., via dismiss arguments) from light dismiss manager 200 that a dismiss event has occurred that should or is going to result in dismissal.

In some implementations, a light dismiss UI surface can be configured to ignore or override certain dismiss events and/or dismiss arguments received from light dismiss manager 200. The notification from light dismiss manager 200 can be implemented as and/or treated by an application or an active light dismiss UI surface as: an explicit instruction that always causes dismissal of the light dismiss UI surface, an instruction that can be overridden based on certain criteria, or an instruction or suggestion that can be ignored by the application or active light dismiss UI surface.

Light dismissal behavior can be applied for various types of UI surfaces (e.g., on-object UIs, command surfaces, controls, etc.) that can register with light dismiss manager 200. Components or surfaces that are built on top of a registered light dismiss UI (e.g. a context menu built on a flyout) can inherit the changes made to the base level component. Custom components or surfaces that are not built on a registered light dismiss UI or control will still be able to register with light dismiss manager 200 to inherit light dismiss behavior.

When a light dismiss UI surface is displayed, an input event (e.g., click, tap, gesture, etc.) that occurs outside the bounds of the light dismiss UI surface can close the light dismiss UI surface. In various implementations, the default light dismiss behavior can be to ingest or "eat" the click or tap during the process so that the target of the tap does not receive and/or execute the tap. For example, by default, a tap on a button outside of a light dismiss UI surface can dismiss the light dismiss UI surface, but the button will not get the tap event.

Referring to FIG. 2C, light dismiss manager 200 can communicate with one or more rendered UI surfaces such as a ribbon 204, pane 205, and/or a custom UI surface 206. To customize, standardize, modify, and/or define light dismiss behavior for one or more applications, windows, UI surfaces, and/or users, light dismiss manager 200 can include a mechanism to specify UI areas and/or scenarios where user input events (e.g., clicks, taps, gestures, etc.) are not ingested or "eaten" and, instead, are allowed to pass to the application and/or UI element for execution. In one implementation, the API exposed by light dismiss manager 200 can include a method that can be called by various UI surfaces (e.g., ribbon 204, pane 205, custom UI surface 206, a control, etc.) to request, define, and/or register an "exclusion area" or "event pass area."

Light dismiss manager 200 can enable a UI surface to register with light dismiss manager 200 if the UI surface wants to use the blocking panel for light dismissal. The API of light dismiss manager 200 can be called by a UI surface to request use of the blocking panel and register exclusion or event pass areas. The API also can include a method that can be called by a registered UI surface to remove an exclusion or event pass area.

Exemplary Blocking Panel Implementations

FIGS. 3A and 3B illustrate exemplary blocking panel implementations in accordance with aspects of the described subject matter. The shape of a blocking panel that excludes event pass areas can be determined by blocking panel implementation module 114 and/or light dismiss manager 200. In one implementation, when a new and/or child light dismiss UI surface notifies light dismiss manager 200 that it is about to open (e.g., new and/or child light dismiss UI surface calls API), light dismiss manager 200 invokes a callback method to notify (e.g., via light dismiss arguments) one or more active light dismiss UI surfaces of appropriate light dismiss behavior. In addition, light dismiss manager 200 manager can determine, calculate, and/or create a blocking panel for the calling light dismiss UI surface to manage user input events in various light dismiss scenarios.

Referring to FIG. 3A, an initial blocking panel 300 can be the entire screen. When a ribbon (and/or pane) registers an exclusion zone 301, the resultant blocking panel 302 is the surface area of the full screen minus the surface area of the ribbon (and/or pane).

Referring to FIG. 3B, the initial blocking panel 300 can be the entire screen. When a UI surface registers a custom exclusion zone 303, the resultant blocking panel 304 is the surface area of the full screen minus the surface area of the custom exclusion zone.

The surface area of an active light dismiss UI surface is automatically excluded because the blocking panel is drawn below the active light dismiss UI surface. In one implementation, as new exclusion zones are registered and get added, the light dismiss manager can perform a geometric subtract operation to redefine the dimensions of the final blocking panel. The light dismiss manager can implement an algorithm that generates a polygon (e.g., multi-rectangle) from a multiple subtract operation for cases where there are multiple exclusion areas registered by multiple UI surfaces which does not result in a rectangular area. For example, an exclusion area inside the blocking panel can be constructed with multiple rectangles. Alternatively or additionally, the light dismiss manager and/or the blocking panel can implement logic to determine whether a click or tap is received in an exclusion area and to pass the click or tap through to the underlying UI surface (e.g., ribbon, pane, canvas area, etc.).

Exemplary Use Case Scenarios

In one exemplary use case scenario, a user is typing text in a word processing application document and wants to change the formatting of the text. The user clicks or taps on a "color" button in the ribbon, and a color picker gallery callout is shown. The user selects a color from the color picker gallery, which does not dismiss the callout, and then the user clicks or taps on a font picker. In one click or tap, the color picker gallery callout dismisses, and a font picker callout is shown. The user chooses a font and then taps back into the canvas. On the tap into the canvas, the font picker is dismissed and the tap is ingested or "eaten" so that the user's insertion pointer is not placed. On a next tap into the canvas, the user's insertion pointer is moved to the location of the tap, and then the user may begin to type again.

In another exemplary use case scenario, a user inserts a picture into a slideshow presentation application slide and wants to resize (e.g., shrink) the picture. The user executes a press-and-hold command to bring up a context menu at a point of invocation but does not find a desired option. As the user continues to search, the user's next tap is on the ribbon on a "picture" tab. The user's tap on the picture tab is immediately executed, and picture options are shown in the ribbon. Additionally, the context menu is immediately dismissed. The user is now able to resize the picture via the options in the ribbon and move onto the next slide.

Exemplary Implementations of Light Dismiss Behavior

Figure 4A:
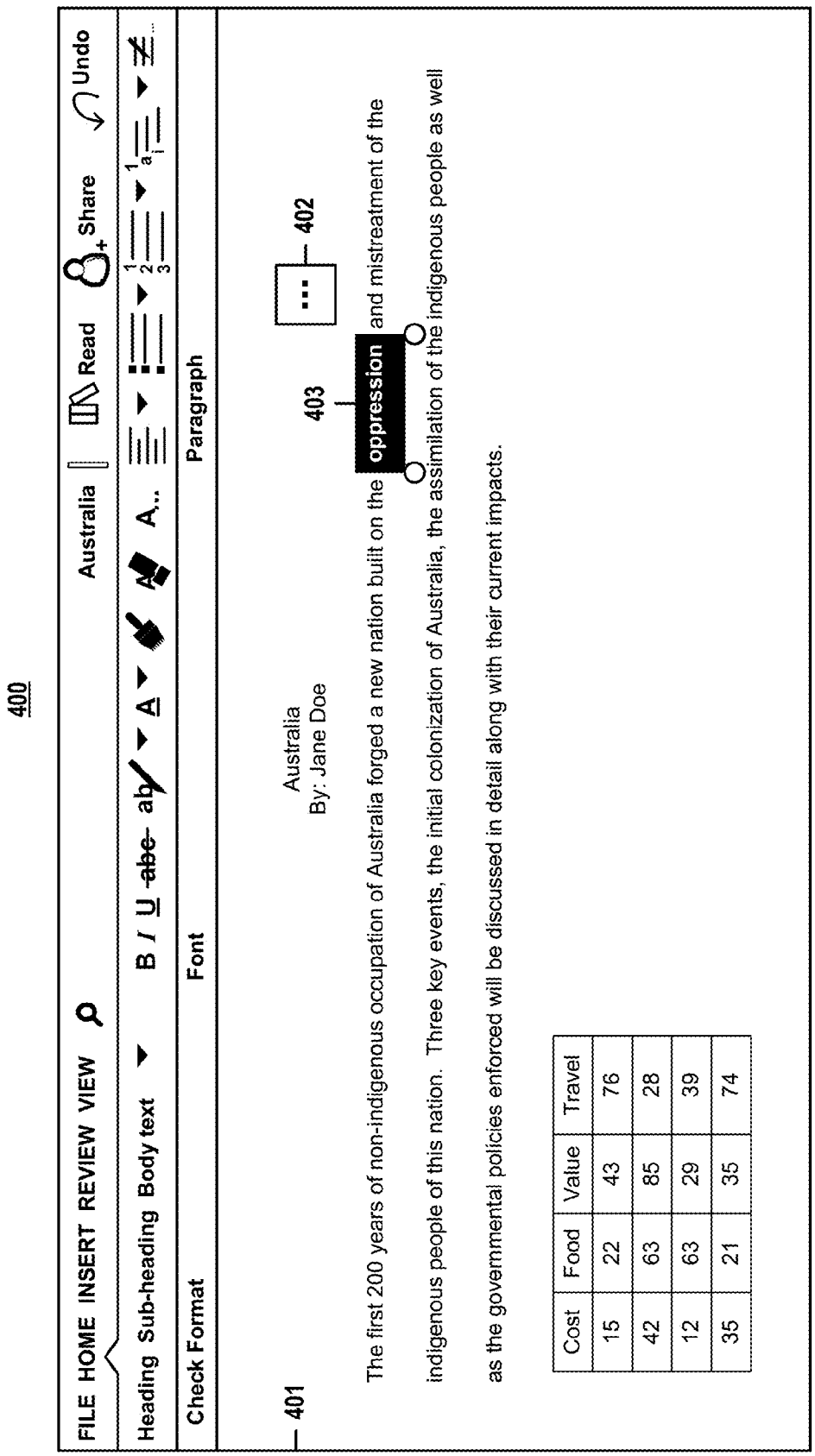

FIGS. 4A-E illustrate exemplary implementations of light dismiss behavior for an application user interface 400 executing on a touch screen computing device. A document 401 having document content within an editable region is shown in FIG. 4A. A user's selection of a word (e.g., double tapping the word, placing and dragging and insertion pointer) can invoke display of a context indicator 402 positioned to the upper-right of the selected word 403. Context indicator 402 can display an icon (e.g., a text character such as an ellipsis or letter, a symbol, an image, etc.) to indicate or represent that user is able to access commands for contextually-related functions.

Figure 4B:
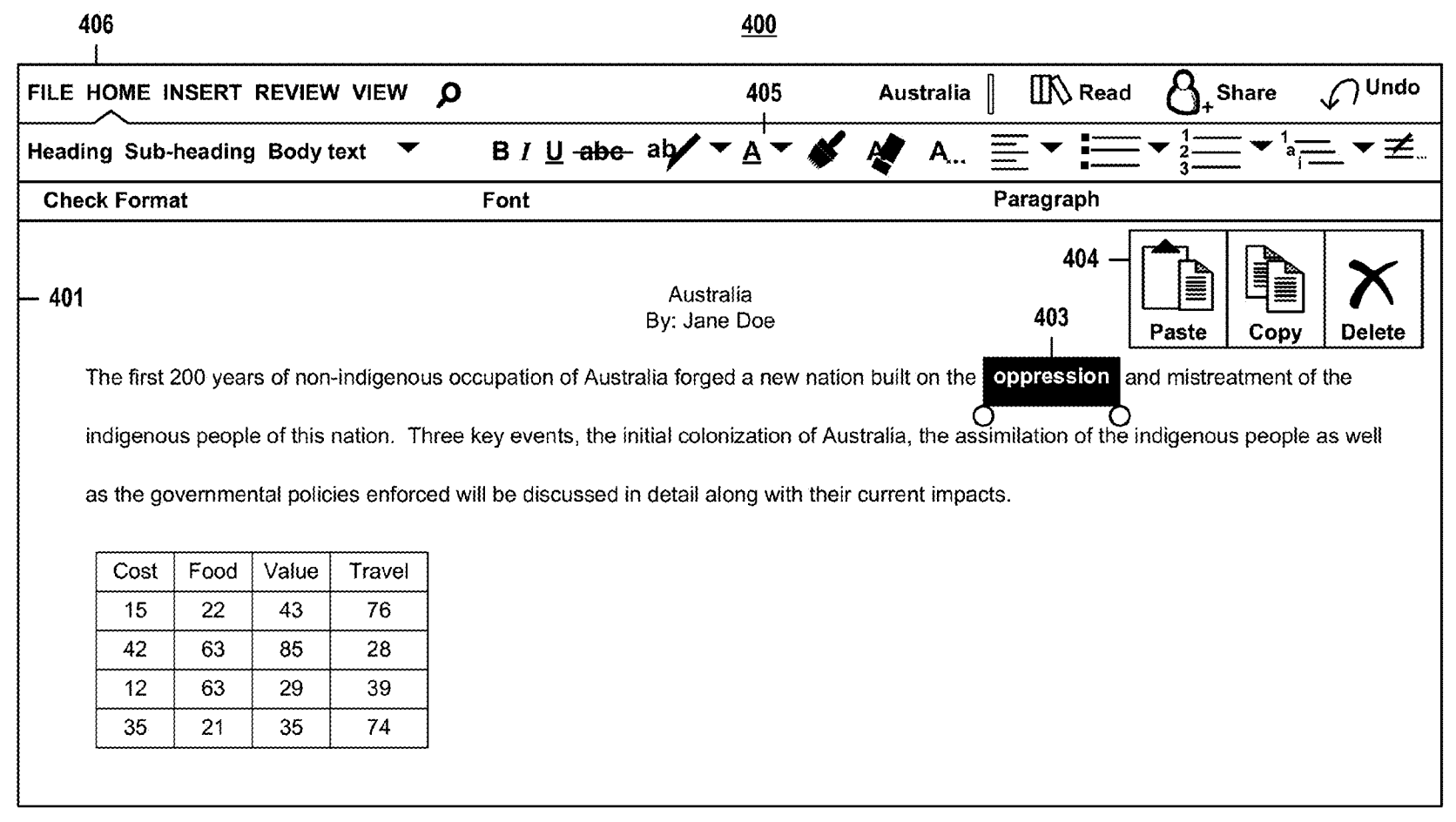

A user's selection of context indicator 402 can invoke a floating command bar 404 as a light dismiss UI surface that hides or is positioned over context indicator 402 and extends to the right, as shown in FIG. 4B. Floating command bar 402 provides an exemplary set of commands including: a paste command, a copy command, and a delete command that are implemented by corresponding buttons.

When the floating command bar 404 is displayed, as shown in FIG. 4B, the user can tap into the canvas of document 401. In response to the tap into the canvas, floating command bar 404 is dismissed, and context indicator 402 can be displayed again, as shown in FIG. 4A.

Figure 4C:
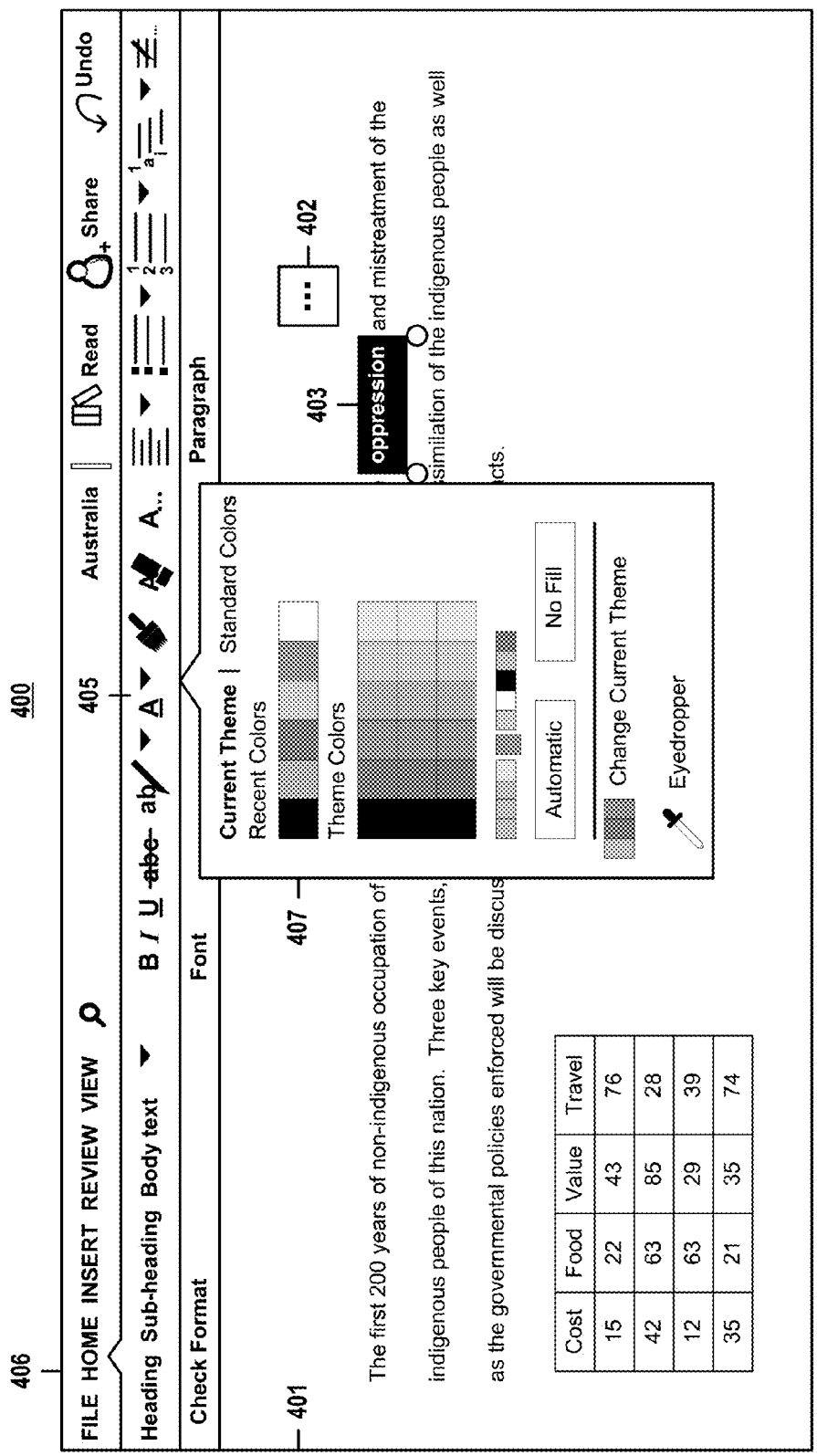

When the floating command bar 404 is displayed, as shown in FIG. 4B, the user can tap into a particular command 405 in a ribbon 406 implemented as a tabbed set of toolbars. In response to the tap into ribbon 406, floating command bar 404 can be dismissed, context indicator 402 can be displayed again, and a callout 407 from ribbon 406 can be displayed, as shown in FIG. 4C.

Figure 4D:
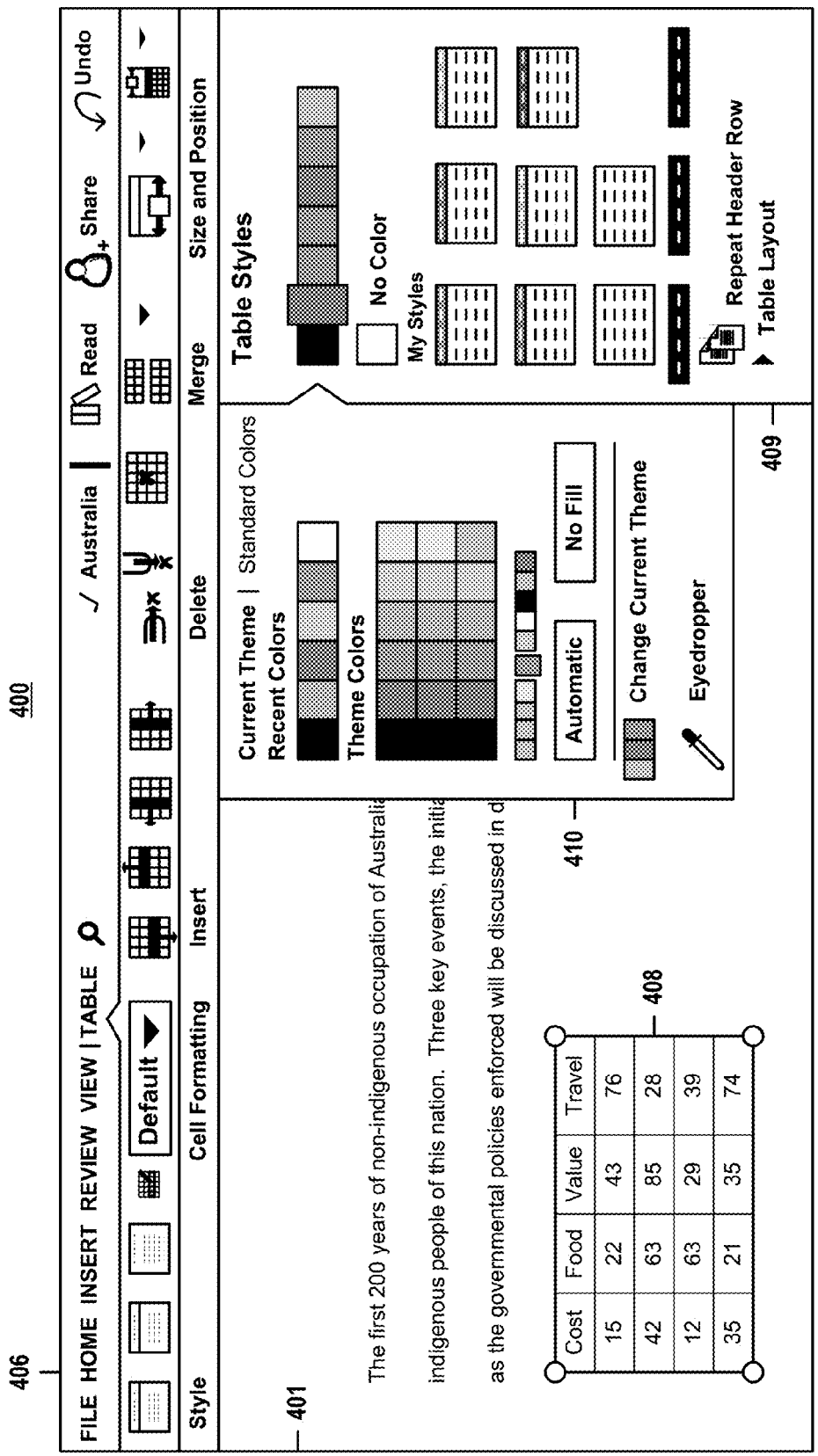
Figure 4E:
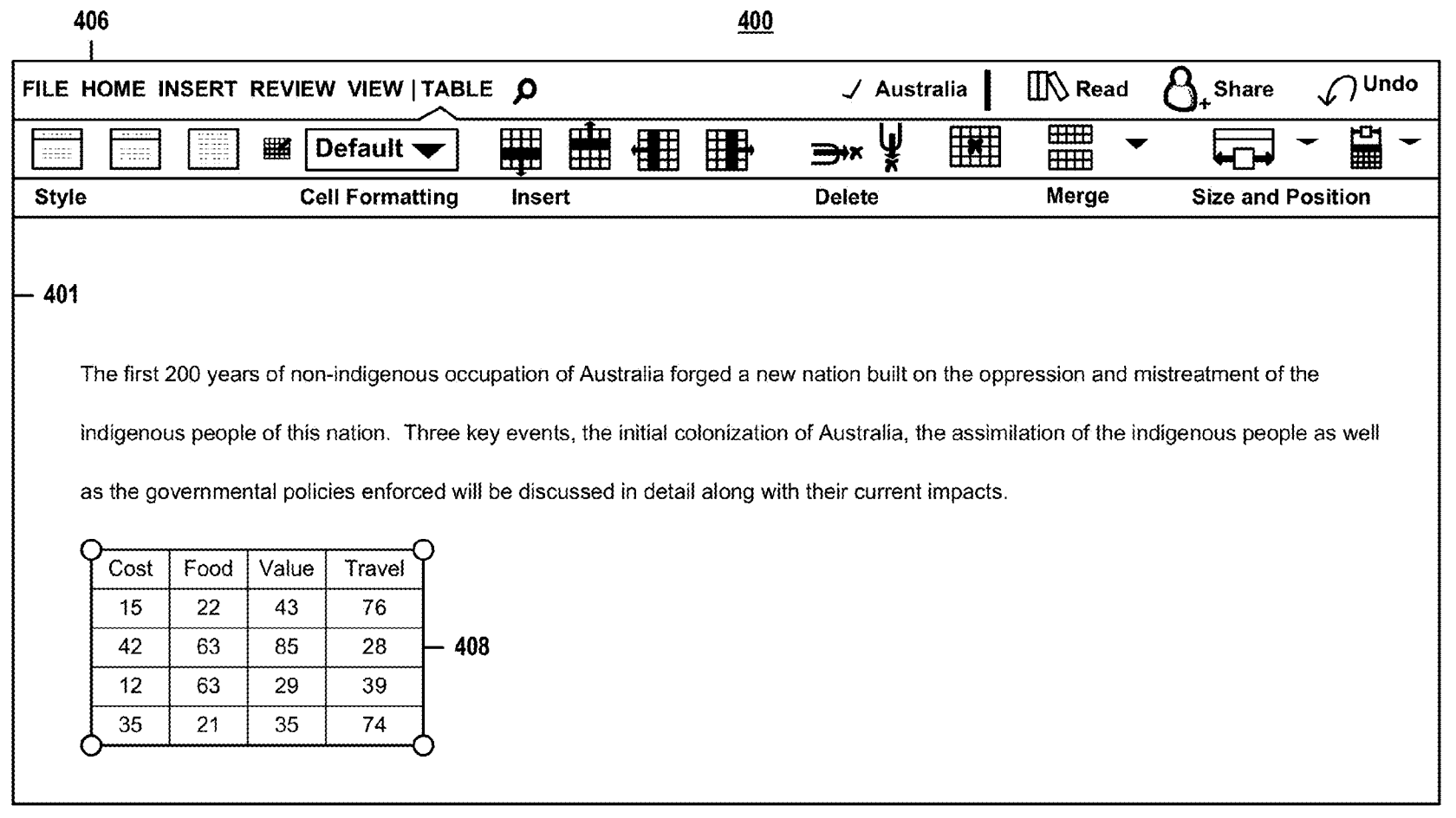

The user can select a table 408 and tap into ribbon 406 to invoke a pane 409, as shown in FIG. 4D. The user can tap into pane 409 to display a flyout 410 as a child light dismiss UI interface surface that is invoked from and anchored to a parent light dismiss UI surface. When pane 409 and flyout 410 are displayed, the user can tap into the canvas of document 401. In response to the tap into the canvas, flyout 410 (child light dismiss UI surface) and pane 409 (parent light dismiss UI surface) are dismissed together, as shown in FIG. 4E. When pane 409 and flyout 410 are dismissed, table 408 remains in a selected state.

Figure 5B:

FIGS. 5A-D illustrate exemplary implementations of light dismiss behavior for an application user interface 500 executing on a touch screen computing device in a reading mode. A user's selection of a word in a document 501 can invoke display of a context indicator 502 positioned to the upper-right of the selected word 503, as shown in FIG. 5A. The user can touch the top of application user interface 500 and swipe in a downward direction. In response to the swipe, context indicator 502 can be dismissed and a pop-up ribbon 504 that implements a set of commands can be displayed at the top of application user interface 500, as shown in FIG. 5B. When pop-up ribbon 504 is displayed, selected word 503 remains in a selected state.

When pop-up ribbon 504 is displayed, as shown in FIG. 5B, the user can tap a command 505 on pop-up ribbon 504. In response to the tap into command 505 on pop-up ribbon 504, a callout 506 from pop-up ribbon 504 can be invoked as a light dismiss UI surface, as shown in FIG. 5C.

Figure 5C:
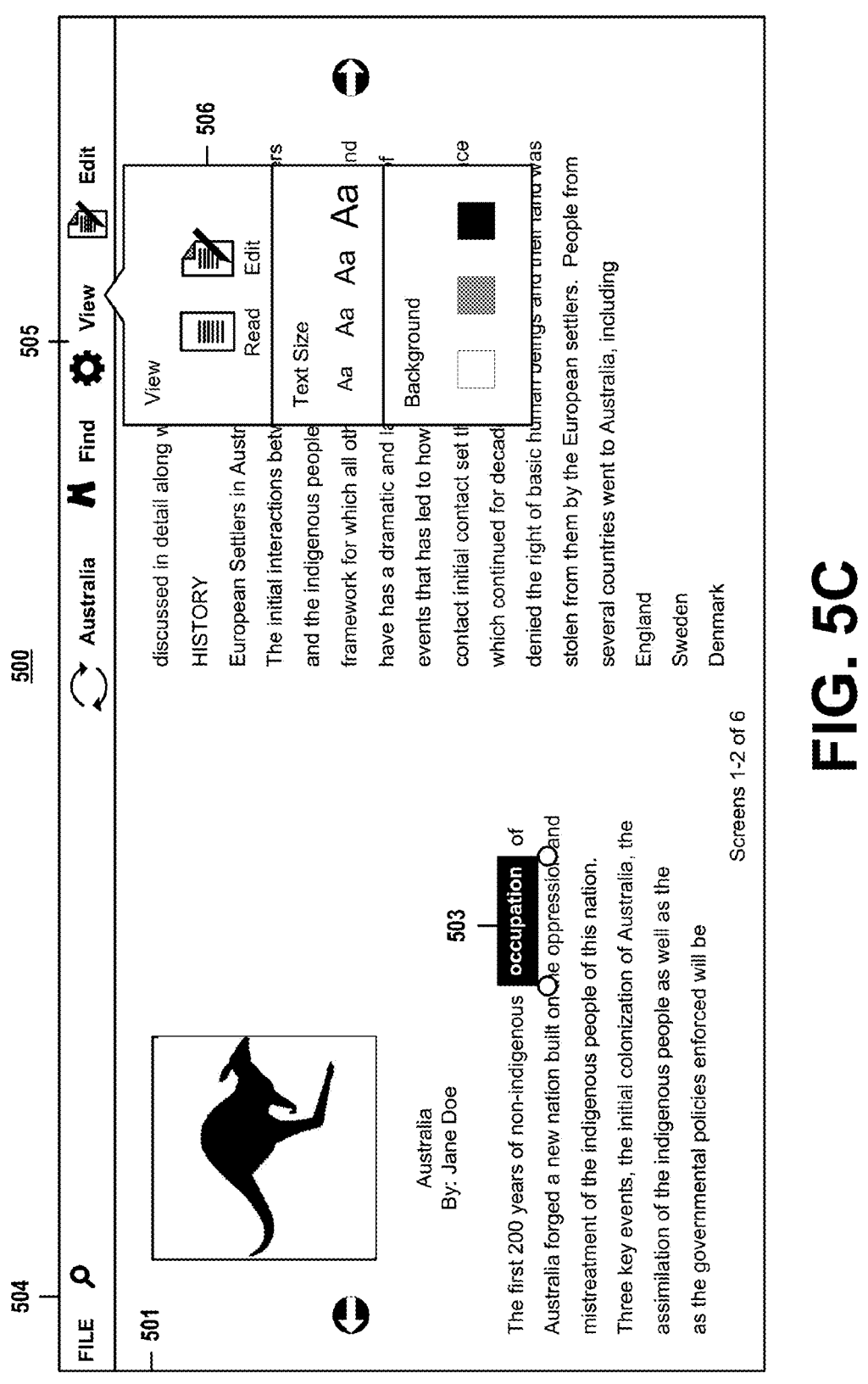

When callout 506 is displayed, as shown in FIG. 5C, the user can tap or double-tap into the canvas of document 501. The tap or double-tap into the canvas can be ingested or "eaten" to dismiss callout 506, dismiss pop-up ribbon 504, and deselect selected word 503. In some implementations, the tap or double-tap into the canvas can dismiss callout 506, dismiss pop-up ribbon 504, deselect selected word 503, and select a new word in the canvas based on the user's touch point, as shown in FIG. 5D. Context indicator 502 can be positioned to the upper-right of the new selected word 507.

In some implementations, pop-up ribbon 504 and a callout 506 can be treated as parent and child light dismiss UI surfaces. Alternatively or additionally, pop-up ribbon 504 can be treated as a rendered UI surface that registers an event pass area.

Exemplary Process for Managing Light Dismiss Behavior

With continuing reference to the foregoing figures, an exemplary process is described below to further illustrate aspects of the described subject matter. It is to be understood that the following exemplary process is not intended to limit the described subject matter to particular implementations.

Figure 6:
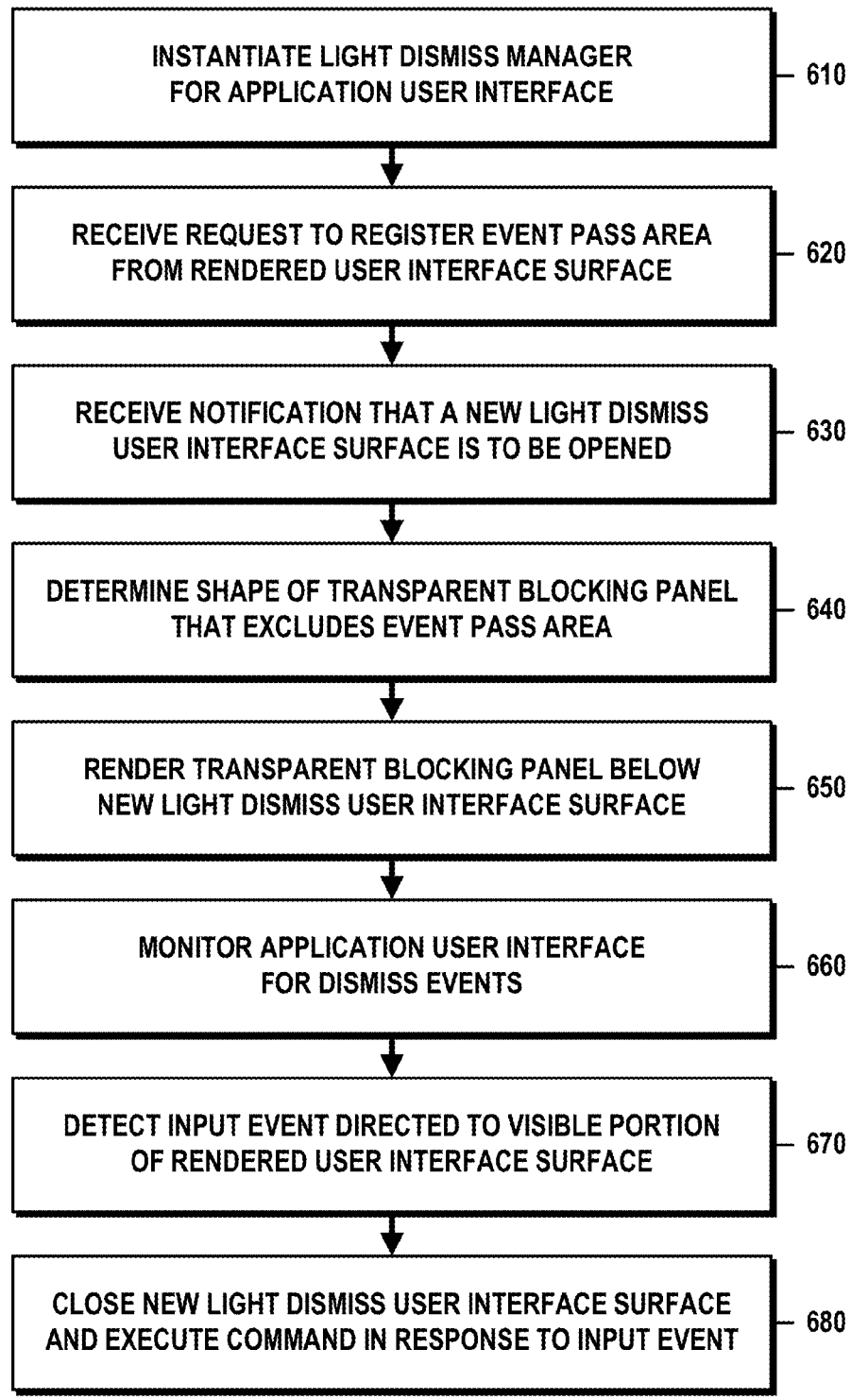
FIG. 6 illustrates an embodiment of an exemplary process in accordance with aspects of the described subject matter.

FIG. 6 illustrates a computer-implemented method 600 as an embodiment of an exemplary process for managing light dismiss behavior in accordance with aspects of the described subject matter. In various embodiments, computer-implemented method 600 can be performed by a computing device and/or a computer system including one or more computing devices. It is to be appreciated that computer-implemented method 600, or portions thereof, can be performed by various computing devices, computer systems, components, and/or computer-executable instructions stored on one more computer-readable storage media.

At 610, a computing device can instantiate a light dismiss manager for an application user interface. For example, a computing device such as one of client devices 101-106 can instantiate light dismiss manager 200 for application user interface 400 or application user interface 500. Light dismiss manager 200 can be instantiated by the computing device, an application, and/or the application user interface via light dismissal management module 110 and/or light dismiss manager implementation module 111.

At 620, the light dismiss manager can receive a request to register an event pass area from a rendered user interface surface of the application user interface. For example, light dismiss manager 200 can receive a request to register an event pass area from a rendered user interface surface (e.g., ribbon 406, pop-up ribbon 504, pane, and/or custom user interface surface) of application user interface 400 or application user interface 500. Light dismiss manager 200 can expose an application programming interface includes a method that is called by the rendered user interface surface to register the event pass area.

At 630, the light dismiss manager can receive a notification that a new light dismiss user interface surface is to be opened in the application user interface. For example, light dismiss manager 200 can receive a notification that a new light dismiss user interface surface (e.g., floating command bar 404, pane 409, flyout 410, callout 506, etc.) is to be opened in application user interface 400 or application user interface 500. Light dismiss manager 200 can expose an application programming interface includes a method that is called by the new light dismiss user interface surface before the new light dismiss user interface surface is opened. If the new light dismiss user interface surface is invoked from an active light dismiss user interface surface, the active light dismiss user interface surface is kept open when the new light dismiss user interface surface is opened. If the new light dismiss user interface surface is not being invoked from an active light dismiss user interface surface, the active light dismiss user interface surface is closed when the new light dismiss user interface surface is opened.

At 640, the light dismiss manager can determine a shape of a transparent blocking panel that excludes the event pass area. For example, light dismiss manager 200 can determine a shape of a transparent blocking panel (e.g., blocking panel 302, blocking panel 304, etc.) that excludes the event pass area (e.g., ribbon 301, custom exclusion zone 303, etc.). Light dismiss manager 200 can exclude the event pass area from a full-screen transparent blocking panel. In some implementations, the transparent blocking panel can exclude multiple event pass areas registered by multiple rendered user interface surfaces.

At 650, the computing device and/or light dismiss manager can render the transparent blocking panel below the new light dismiss user interface surface. For example, when the new light dismiss user interface surface (e.g., floating command bar 404, pane 409, flyout 410, callout 506, etc.) is opened in application user interface 400 or application user interface 500, the transparent blocking panel (e.g., blocking panel 302, blocking panel 304, etc.) can be rendered below the new light dismiss user interface surface. The transparent blocking panel can be configured to prevent execution of commands associated with visible portions of the application user interface that are outside of both the new light dismiss user interface surface (e.g., floating command bar 404, pane 409, flyout 410, callout 506, etc.) and the event pass area (e.g., ribbon 301, custom exclusion zone 303, etc.).

At 660, the light dismiss manager can monitor the application user interface for dismiss events. For example, when the new light dismiss user interface surface (e.g., floating command bar 404, pane 409, flyout 410, callout 506, etc.) is open, light dismiss manager 200 can monitor application user interface 400 or application user interface 500 for dismiss events. Exemplary dismiss events can include: input events directed outside of a boundary of the new light dismiss user interface surface, opening of another light dismiss user interface surface that is not invoked from the new light dismiss user interface surface, pressing of certain keys, a loss of focus of the application user interface, and/or other suitable dismiss events.

At 670, the light dismiss manager can detect an input event directed to the visible portion of the rendered user interface surface. For example, when the new light dismiss user interface surface (e.g., floating command bar 404, pane 409, flyout 410, callout 506, etc.) is open, light dismiss manager 200 can detect an input event (e.g., touch input from a user) directed to the visible portion of the rendered user interface surface (e.g., ribbon 406, pop-up ribbon 504, pane, and/or custom user interface surface) of application user interface 400 or application user interface 500.

At 680, the computing device, light dismiss manager and/or application user interface can close the new light dismiss user interface surface and execute a command in response to the input event. For example, in response to the input event, light dismiss manager 200 can send a dismissal notification to the new light dismiss user interface surface (e.g., floating command bar 404, pane 409, flyout 410, callout 506, etc.). Light dismiss manager 200 can expose an application programming interface that includes a callback method that is invoked to send a dismissal notification to the new light dismiss user interface surface when the input event is detected. In some cases, a visible light dismiss user interface surface can close itself upon receiving the dismissal notification. If the new light dismiss user interface surface was invoked from an active light dismiss user interface surface that was kept open when the new light dismiss user interface surface was opened, light dismiss manager 200 can send a dismissal notification to the active light dismiss user interface surface in response to the input event. Together with closing the new light dismiss user interface surface, a command (e.g., command 405, command 505, selecting a word in a document, etc.) associated with the visible portion of the rendered user interface surface and/or directed to the event pass area can be executed by the computing device, application, and/or application user interface.

Exemplary Operating Environments

Aspects of the described subject matter can be implemented for and/or by various operating environments, computer networks, platforms, frameworks, computer architectures, and/or computing devices. Aspects of the described subject matter can be implemented by computer-executable instructions that can be executed by one or more computing devices, computer systems, and/or processors.

In its most basic configuration, a computing device and/or computer system can include at least one processing unit (e.g., single-processor units, multi-processor units, single-core units, and/or multi-core units) and memory. Depending on the exact configuration and type of computer system or computing device, the memory implemented by a computing device and/or computer system can be volatile (e.g., random access memory (RAM)), non-volatile (e.g., read-only memory (ROM), flash memory, and the like), or a combination thereof.

A computing device and/or computer system can have additional features and/or functionality. For example, a computing device and/or computer system can include hardware such as additional storage (e.g., removable and/or non-removable) including, but not limited to: solid state, magnetic, optical disk, or tape.

A computing device and/or computer system typically can include or can access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) can be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter can be implemented by computer-executable instructions stored on one or more computer-readable storage media. Computer-executable instructions can be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system can include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device can provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device can be configured to receive and respond to input in various ways depending upon implementation. Responses can be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system can include one or more communication interfaces that allow communication between and among other computing devices and/or computer systems. Communication interfaces can be used in the context of network communication between and among various computing devices and/or computer systems. Communication interfaces can allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces can be used in the context of accessing, obtaining data from, and/or cooperating with various types of resources.

Communication interfaces also can be used in the context of distributing computer-executable instructions over a network or combination of networks. For example, computer-executable instructions can be combined or distributed utilizing remote computers and storage devices. A local or terminal computer can access a remote computer or remote storage device and download a computer program or one or more parts of the computer program for execution. It also can be appreciated that the execution of computer-executable instructions can be distributed by executing some instructions at a local terminal and executing some instructions at a remote computer.

A computing device can be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device can be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also can be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device can include and/or run one or more computer programs implemented, for example, by software, firmware, hardware, logic, and/or circuitry of the computing device. Computer programs can be distributed to and/or installed on a computing device in various ways. For instance, computer programs can be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device can include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device can include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device can include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system can be implemented by a computing device, such as a server computer, or by multiple computing devices configured to implement a service in which one or more suitably-configured computing devices can perform one or more processing steps. A computer system can be implemented as a distributed computing system in which components are located on different computing devices that are connected to each other through network (e.g., wired and/or wireless) and/or other forms of direct and/or indirect connections. A computer system also can be implemented via a cloud-based architecture (e.g., public, private, or a combination thereof) in which services are delivered through shared datacenters. For instance, a computer system can be implemented by physical servers of a datacenter that provide shared computing and storage resources and that host virtual machines having various roles for performing different tasks in conjunction with providing cloud-based services. Exemplary virtual machine roles can include, without limitation: web server, front end server, application server, database server (e.g., SQL server), domain controller, domain name server, directory server, and/or other suitable machine roles. Some components of a computer system can be disposed within a cloud while other components are disposed outside of the cloud.

Figure 7:
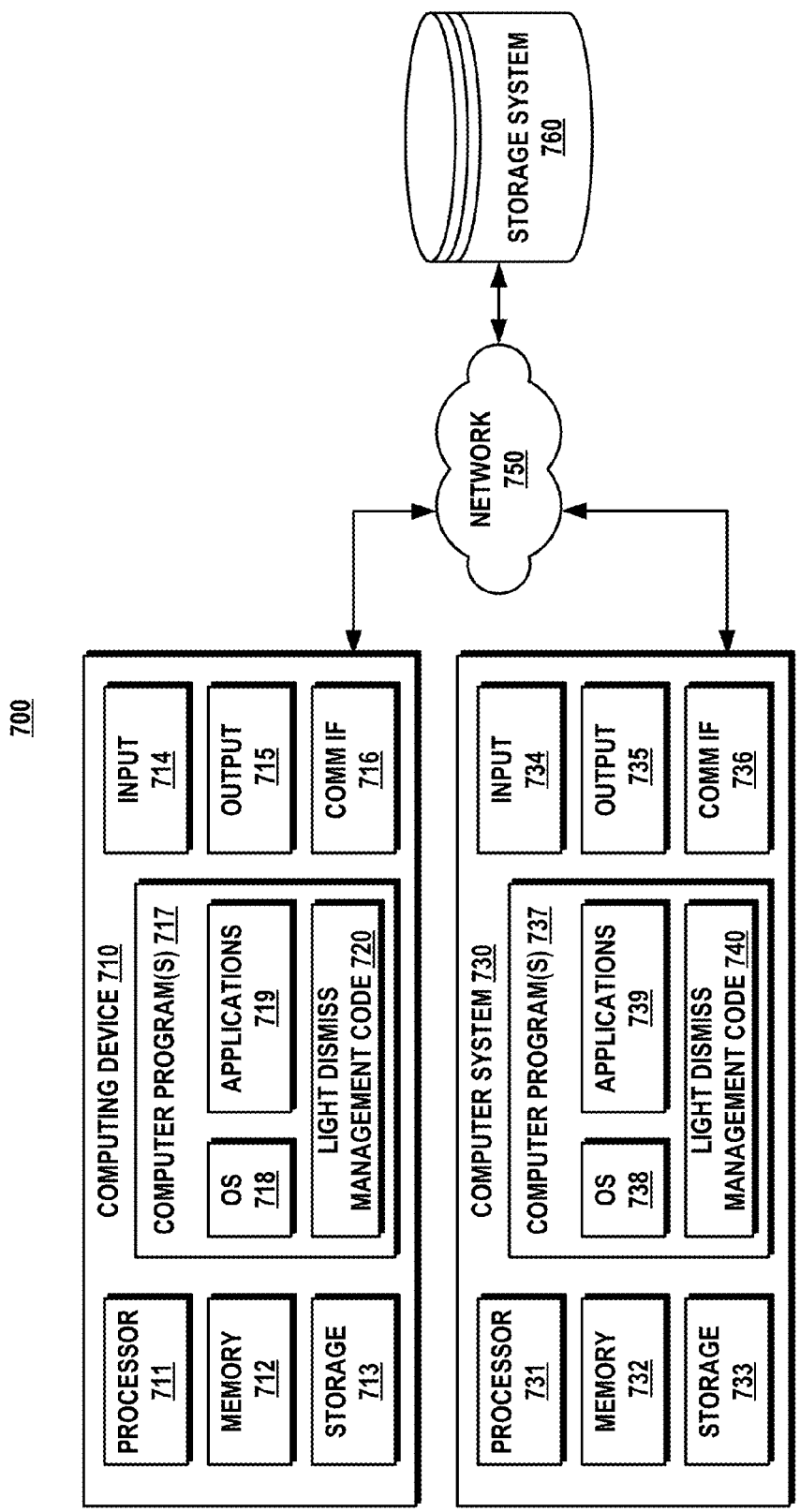
FIG. 7 illustrates an embodiment of an exemplary operating environment that can implement aspects of the described subject matter.

FIG. 7 illustrates an operating environment 700 as an embodiment of an exemplary operating environment that can implement aspects of the described subject matter. It is to be appreciated that operating environment 700 can be implemented by a client-server model and/or architecture as well as by other operating environment models and/or architectures in various embodiments.

Operating environment 700 can include a computing device 710, which can implement aspects of the described subject matter. Computing device 710 can include a processor 711 and memory 712. Computing device 710 also can include additional hardware storage 713. It is to be understood that computer-readable storage media includes memory 712 and hardware storage 713.

Computing device 710 can include input devices 714 and output devices 715. Input devices 714 can include one or more of the exemplary input devices described above and/or other type of input mechanism and/or device. Output devices 715 can include one or more of the exemplary output devices described above and/or other type of output mechanism and/or device.

Computing device 710 can contain one or more communication interfaces 716 that allow computing device 710 to communicate with other computing devices and/or computer systems. Communication interfaces 716 also can be used in the context of distributing computer-executable instructions.

Computing device 710 can include and/or run one or more computer programs 717 implemented, for example, by software, firmware, hardware, logic, and/or circuitry of computing device 710. Computer programs 717 can include an operating system 718 implemented, for example, by one or more exemplary operating systems described above and/or other type of operating system suitable for running on computing device 710. Computer programs 717 can include one or more applications 719 implemented, for example, by one or more exemplary applications described above and/or other type of application suitable for running on computing device 710.

Computer programs 717 can be configured via one or more suitable interfaces (e.g., API or other data connection) to communicate and/or cooperate with one or more resources. Examples of resources include local computing resources of computing device 710 and/or remote computing resources such as server-hosted resources, cloud-based resources, online resources, remote data stores, remote databases, remote repositories, web services, web sites, web pages, web content, and/or other types of remote resources.

Computer programs 717 can implement computer-executable instructions that are stored in computer-readable storage media such as memory 712 or hardware storage 713, for example. Computer-executable instructions implemented by computer programs 717 can be configured to work in conjunction with, support, and/or enhance one or more of operating system 718 and applications 719. Computer-executable instructions implemented by computer programs 717 also can be configured to provide one or more separate and/or stand-alone services.

Computing device 710 and/or computer programs 717 can implement and/or perform various aspects of the described subject matter. As shown, computing device 710 and/or computer programs 717 can include light dismiss management code 720. In various embodiments, light dismiss management code 720 can include computer-executable instructions that are stored on a computer-readable storage medium and configured to implement one or more aspects of the described subject matter. By way of example, and without limitation, light dismiss management code 720 can be implemented by computing device 710 which, in turn, can represent one of client devices 101-106. By way of further example, and without limitation, light dismiss management code 720 can implement light dismissal management module 110 and/or light dismiss manager 200, determine the shape of blocking panel 302 and/or blocking panel 304, control light dismiss behavior for application user interface 400 and/or application user interface 500, and/or perform one or more aspects of computer-implemented method 600.

Operating environment 700 can include a computer system 730, which can implement aspects of the described subject matter. Computer system 730 can be implemented by one or more computing devices such as one or more server computers. Computer system 730 can include a processor 731 and memory 732. Computer system 730 also can include additional hardware storage 733. It is to be understood that computer-readable storage media includes memory 732 and hardware storage 733. Computer system 730 can include input devices 734 and output devices 735. Input devices 734 can include one or more of the exemplary input devices described above and/or other type of input mechanism and/or device. Output devices 735 can include one or more of the exemplary output devices described above and/or other type of output mechanism and/or device.

Computer system 730 can contain one or more communication interfaces 736 that allow computer system 730 to communicate with various computing devices (e.g., computing device 710) and/or other computer systems. Communication interfaces 736 also can be used in the context of distributing computer-executable instructions.

Computer system 730 can include and/or run one or more computer programs 737 implemented, for example, by software, firmware, hardware, logic, and/or circuitry of computer system 730. Computer programs 737 can include an operating system 738 implemented, for example, by one or more exemplary operating systems described above and/or other type of operating system suitable for running on computer system 730. Computer programs 737 can include one or more applications 739 implemented, for example, by one or more exemplary applications described above and/or other type of application suitable for running on computer system 730.

Computer programs 737 can be configured via one or more suitable interfaces (e.g., API or other data connection) to communicate and/or cooperate with one or more resources. Examples of resources include local computing resources of computer system 730 and/or remote computing resources such as server-hosted resources, cloud-based resources, online resources, remote data stores, remote databases, remote repositories, web services, web sites, web pages, web content, and/or other types of remote resources.

Computer programs 737 can implement computer-executable instructions that are stored in computer-readable storage media such as memory 732 or hardware storage 733, for example. Computer-executable instructions implemented by computer programs 737 can be configured to work in conjunction with, support, and/or enhance one or more of operating system 738 and applications 739. Computer-executable instructions implemented by computer programs 737 also can be configured to provide one or more separate and/or stand-alone services.

Computing system 730 and/or computer programs 737 can implement and/or perform various aspects of the described subject matter. As shown, computer system 730 and/or computer programs 737 can include light dismiss management code 740. In various embodiments, light dismiss management code 740 can include computer-executable instructions that are stored on a computer-readable storage medium and configured to implement one or more aspects of the described subject matter. By way of example, and without limitation, light dismiss management code 740 can be implemented by computer system 730 which, in turn, can implement light dismissal management module 110 and/or light dismiss manager 200, determine the shape of blocking panel 302 and/or blocking panel 304, control light dismiss behavior for application user interface 400 and/or application user interface 500, and/or perform one or more aspects of computer-implemented method 600.

Computing device 710 and computer system 730 can communicate over network 750, which can be implemented by any type of network or combination of networks suitable for providing communication between computing device 710 and computer system 730. Network 750 can include, for example and without limitation: a WAN such as the Internet, a LAN, a telephone network, a private network, a public network, a packet network, a circuit-switched network, a wired network, and/or a wireless network. Computing device 710 and computer system 730 can communicate over network 750 using various communication protocols and/or data types. One or more communication interfaces 716 of computing device 710 and one or more communication interfaces 736 of computer system 730 can bekk employed in the context of communicating over network 750.

Computing device 710 and/or computer system 730 can communicate with a storage system 760 over network 750. Alternatively or additionally, storage system 760 can be integrated with computing device 710 and/or computer system 730. Storage system 760 can be representative of various types of storage in accordance with the described subject matter. Storage system 760 can provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 760 can be implemented by one or more computing devices, such as a computer cluster in a datacenter, by virtual machines, and/or provided as a cloud-based storage service.

Figure 8:
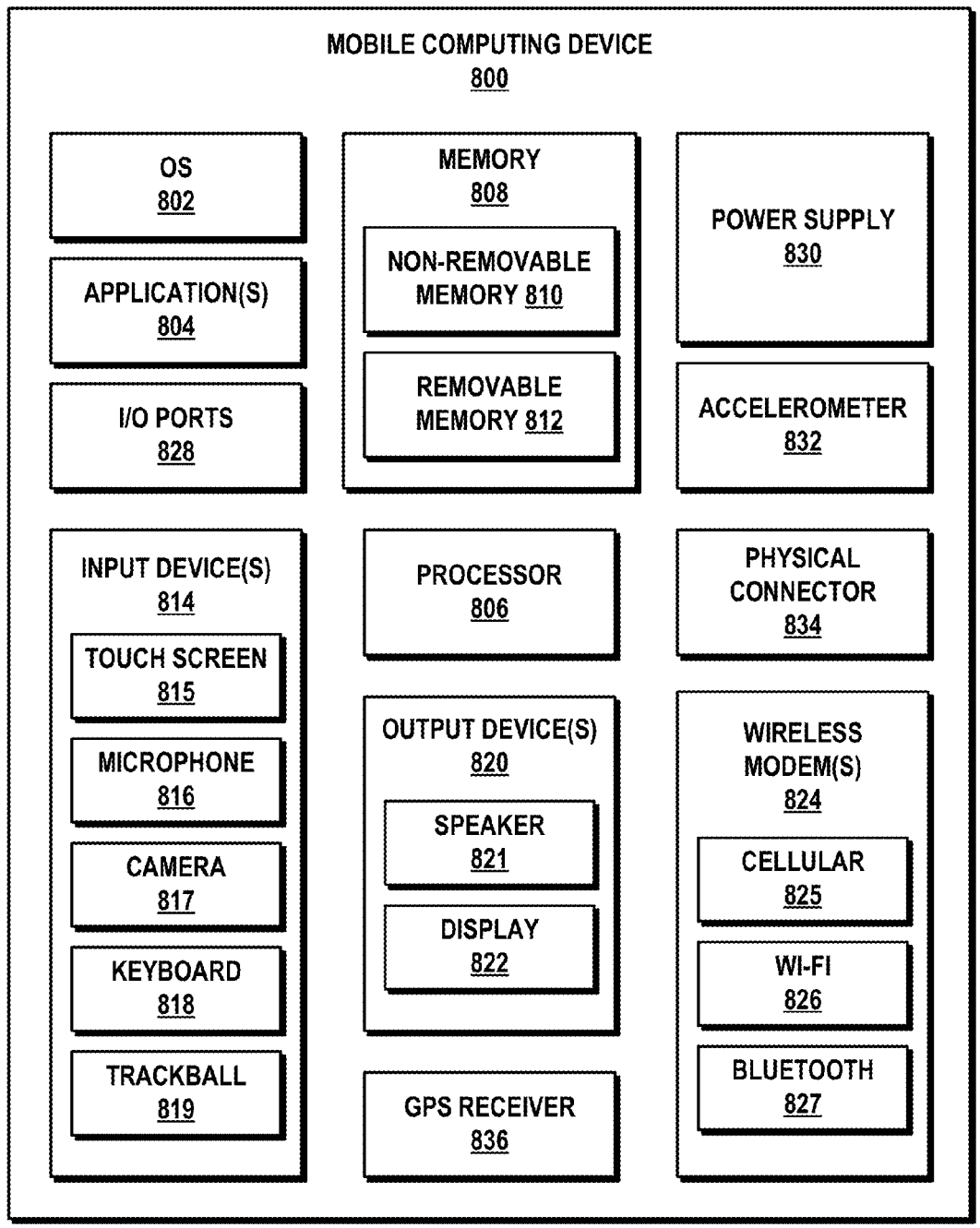
FIG. 8 illustrates an embodiment of an exemplary mobile computing device that can implement aspects of the described subject matter.

FIG. 8 illustrates a mobile computing device 800 as an embodiment of an exemplary mobile computing device that can implement aspects of the described subject matter. In various implementations, mobile computing device 800 can be an example of one or more of: client devices 102-104 and/or computing device 710.

As shown, mobile computing device 800 includes a variety of hardware and software components that can communicate with each other. Mobile computing device 800 can represent any of the various types of mobile computing device described herein and can allow wireless two-way communication over a network, such as one or more mobile communications networks (e.g., cellular and/or satellite network), a LAN, and/or a WAN.

Mobile computing device 800 can include an operating system 802 and various types of mobile application(s) 804. In some implementations, mobile application(s) 804 can include one or more client application(s) and/or components of light dismiss management code 720 (e.g., light dismissal management module 110).

Mobile computing device 800 can include a processor 806 (e.g., signal processor, microprocessor, ASIC, or other control and processing logic circuitry) for performing tasks such as: signal coding, data processing, input/output processing, power control, and/or other functions.

Mobile computing device 800 can include memory 808 implemented as non-removable memory 810 and/or removable memory 812. Non-removable memory 810 can include RAM, ROM, flash memory, a hard disk, or other memory device. Removable memory 812 can include flash memory, a Subscriber Identity Module (SIM) card, a "smart card" and/or other memory device.

Memory 808 can be used for storing data and/or code for running operating system 802 and/or mobile application(s) 804. Example data can include web pages, text, images, sound files, video data, or other data to be sent to and/or received from one or more network servers or other devices via one or more wired and/or wireless networks. Memory 808 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 800 can include and/or support one or more input device(s) 814, such as a touch screen 815, a microphone 816, a camera 817, a keyboard 818, a trackball 819, and other types of input devices (e.g., NUI device and the like). Touch screen 815 can be implemented, for example, using a capacitive touch screen and/or optical sensors to detect touch input. Mobile computing device 800 can include and/or support one or more output device(s) 820, such as a speaker 821, a display 822, and/or other types of output devices (e.g., piezoelectric or other haptic output devices). In some implementations, touch screen 815 and display 822 can be combined in a single input/output device.

Mobile computing device 800 can include wireless modem(s) 824 that can be coupled to antenna(s) (not shown) and can support two-way communications between processor 806 and external devices. Wireless modem(s) 824 can include a cellular modem 825 for communicating with a mobile communication network and/or other radio-based modems such as Wi-Fi modem 826 and/or Bluetooth modem 827. Typically, at least one of wireless modem(s) 824 is configured for: communication with one or more cellular networks, such as a GSM network for data and voice communications within a single cellular network; communication between cellular networks; or communication between mobile computing device 800 and a public switched telephone network (PSTN).

Mobile computing device 800 can further include at least one input/output port 828, a power supply 830, an accelerometer 832, a physical connector 834 (e.g., a USB port, IEEE 1394 (FireWire) port, RS-232 port, and the like), and/or a Global Positioning System (GPS) receiver 836 or other type of a satellite navigation system receiver. It can be appreciated the illustrated components of mobile computing device 800 are not required or all-inclusive, as various components can be omitted and other components can be included in various embodiments.

In various implementations, components of mobile computing device 800 can be configured to perform various operations in connection with aspects of the described subject matter. By way of example, and without limitation, mobile computing device 800 can implement light dismissal management module 110 and/or light dismiss manager 200, determine the shape of blocking panel 302 and/or blocking panel 304, control light dismiss behavior for application user interface 400 and/or application user interface 500, and/or perform one or more aspects of computer-implemented method 600. Computer-executable instructions for performing such operations can be stored in a computer-readable storage medium, such as memory 808 for instance, and can be executed by processor 806.

Supported Aspects

The detailed description provided above in connection with the appended drawings explicitly describes and supports various aspects in accordance with the described subject matter. By way of illustration and not limitation, supported aspects include a computing device configured to manage light dismiss behavior in an application user interface, the computer system comprising: a processor configured to execute computer-executable instructions; and memory storing computer-executable instructions configured to: instantiate a light dismiss manager for the application user interface; receive, by the light dismiss manager, a request to register an event pass area from a rendered user interface surface of the application user interface; receive, by the light dismiss manager, a notification that a new light dismiss user interface surface is to be opened in the application user interface; determine, by the light dismiss manager, a shape of a transparent blocking panel that excludes the event pass area; render the transparent blocking panel below the new light dismiss user interface surface when the new light dismiss user interface surface is opened in the application user interface; detect, by the light dismiss manager, an input event directed to a visible portion of the rendered user interface surface; and close the new light dismiss user interface surface and execute a command associated with the visible portion of the rendered user interface surface in response to the input event.

Supported aspects include the forgoing computing device, wherein the memory further stores computer-executable instructions configured to: determine that the new light dismiss user interface surface is being invoked from an active light dismiss user interface surface; keep the active light dismiss user interface surface open when the new light dismiss user interface surface is opened; and close the active light dismiss user interface surface together with the new light dismiss user interface surface in response to the input event.

Supported aspects include any of the forgoing computing devices, wherein the memory further stores computer-executable instructions configured to: determine that the new light dismiss user interface surface is not being invoked from an active light dismiss user interface surface; and close the active light dismiss user interface surface when the new light dismiss user interface surface is opened.

Supported aspects include any of the forgoing computing devices, wherein the input event is touch input from a user.

Supported aspects include any of the forgoing computing devices, wherein the memory further stores computer-executable instructions configured to: monitor the application user interface for dismiss events when the new light dismiss user interface surface is open in the application user interface. Supported aspects further include: the dismiss events including: input events directed outside of a boundary of the new light dismiss user interface surface, opening of another light dismiss user interface surface that is not invoked from the new light dismiss user interface surface, pressing of certain keys, and a loss of focus of the application user interface.

Supported aspects include any of the forgoing computing devices, wherein the light dismiss manager exposes an application programming interface including a method that is called by the new light dismiss user interface surface before the new light dismiss user interface surface is opened. Supported aspects further include: the application programming interface including a callback method that is invoked to send a dismissal notification to the new light dismiss user interface surface when the input event is detected. Supported aspects further include: the application programming interface including a method that is called by the rendered user interface surface to register the event pass area.

Supported aspects further include an apparatus, a system, a computer-readable storage medium, a computer-implemented method, and/or means for implementing any of the foregoing computing devices or portions thereof.

Supported aspects include a computer-implemented method for managing light dismiss behavior in an application user interface, the computer-implemented method comprising: instantiating, by the computing device, a light dismiss manager for the application user interface; receiving, by the light dismiss manager, a request to register an event pass area from a rendered user interface surface of the application user interface; receiving, by the light dismiss manager, a notification that a new light dismiss user interface surface is to be opened in the application user interface; determining, by the light dismiss manager, a shape of a transparent blocking panel that excludes the event pass area; and rendering the transparent blocking panel below the new light dismiss user interface surface when the new light dismiss user interface surface is opened in the application user interface, wherein the transparent blocking panel is configured to prevent execution of commands associated with visible portions of the application user interface that are outside of both the new light dismiss user interface surface and the event pass area.

Supported aspects include the forgoing computer-implemented method, further comprising: monitoring the application user interface for dismiss events including input events directed outside of the new light dismiss user interface surface and invocation of another light dismiss user interface surface that is not anchored to the new light dismiss user interface surface.

Supported aspects include any of the forgoing computer-implemented methods, further comprising: closing the new light dismiss user interface surface and executing a command associated a visible portion of the rendered user interface surface in response detecting an input event directed to the event pass area. Supported aspects further include: executing the command comprising selecting a word in a document. Supported aspects further include: determining that the new light dismiss user interface surface is being invoked from an active light dismiss user interface surface; keeping the active light dismiss user interface surface open when the new light dismiss user interface surface is opened; and closing the active light dismiss user interface surface together with the new light dismiss user interface surface in response to the input event.

Supported aspects include any of the forgoing computer-implemented methods, wherein the rendered user interface surface is a ribbon comprising a tabbed set of toolbars.

Supported aspects include any of the forgoing computer-implemented methods, wherein the event pass area is a custom exclusion zone inside of the transparent blocking panel.

Supported aspects include any of the forgoing computer-implemented methods, wherein the transparent blocking panel excludes multiple event pass areas registered by multiple rendered user interface surfaces.

Supported aspects further include an apparatus, a system, a computer-readable storage medium, and/or means for implementing and/or performing any of the foregoing computer-implemented methods or portions thereof.

Supported aspects include a computer-readable storage medium storing computer-executable instructions that, when executed by a computing device, cause the computing device to implement a light dismiss manager configured to: receive a request to register an event pass area from a rendered user interface surface of an application user interface; receive a notification that a new light dismiss user interface surface is to be opened in the application user interface; exclude the event pass area from a transparent blocking panel that is to be rendered below the new light dismiss user interface surface when the new light dismiss user interface surface is opened in the application user interface; monitor the application user interface for dismiss events when the new light dismiss user interface surface is open in the application user interface; and send a dismissal notification to the new light dismiss user interface surface in response to detecting an input event directed to the event pass area, wherein the input event passes through the transparent blocking panel and executes a command associated with a visible portion of the rendered user interface surface.

Supported aspects include the foregoing computer-readable storage medium, wherein the light dismiss manager is further configured to: determine that the new light dismiss user interface surface is being invoked from an active light dismiss user interface surface that is kept open when the new light dismiss user interface surface is opened; and send a dismissal notification to the active light dismiss user interface surface in response to the input event.

Supported aspects include the foregoing computer-readable storage media, wherein the light dismiss manager is further configured to: determine that the new light dismiss user interface surface is not being invoked from an active light dismiss user interface surface; and send a dismissal notification to the active light dismiss user interface surface in response to the notification that the new light dismiss user interface surface is to be opened in the application user interface.

Supported aspects further include an apparatus, a system, a computer-implemented method, and/or means for implementing any of the foregoing computer-readable storage media or performing the functions thereof.

Supported aspects can provide various attendant and/or technical advantages in terms of improved efficiency and/or savings with respect to power consumption, memory, processor cycles, and/or other computationally-expensive resources.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing device configured to manage light dismiss behavior in an application user interface, the computer system comprising:
   a processor configured to execute computer-executable instructions; and
   memory storing computer-executable instructions configured to:
      instantiate a light dismiss manager for the application user interface;
      receive, by the light dismiss manager, a request to register an event pass area from a rendered user interface surface of the application user interface;
      receive, by the light dismiss manager, a notification that a new light dismiss user interface surface is to be opened in the application user interface;
      determine, by the light dismiss manager, a shape of a transparent blocking panel that excludes the event pass area;
      render the transparent blocking panel below the new light dismiss user interface surface when the new light dismiss user interface surface is opened in the application user interface;

detect, by the light dismiss manager, an input event directed to a visible portion of the rendered user interface surface; and close the new light dismiss user interface surface and execute a command associated with the visible portion of the rendered user interface surface in response to the input event.

2. The computing device of claim 1, wherein the memory further stores computer-executable instructions configured to:

determine that the new light dismiss user interface surface is being invoked from an active light dismiss user interface surface;

keep the active light dismiss user interface surface open when the new light dismiss user interface surface is opened; and close the active light dismiss user interface surface together with the new light dismiss user interface surface in response to the input event.

3. The computing device of claim 1, wherein the memory further stores computer-executable instructions configured to:

determine that the new light dismiss user interface surface is not being invoked from an active light dismiss user interface surface; and close the active light dismiss user interface surface when the new light dismiss user interface surface is opened.

4. The computing device of claim 1, wherein the input event is touch input from a user.

5. The computing device of claim 1, wherein the memory further stores computer-executable instructions configured to:

monitor the application user interface for dismiss events when the new light dismiss user interface surface is open in the application user interface.

6. The computing device of claim 5, wherein the dismiss events include: input events directed outside of a boundary of the new light dismiss user interface surface, opening of another light dismiss user interface surface that is not invoked from the new light dismiss user interface surface, pressing of certain keys, and a loss of focus of the application user interface.

7. The computing device of claim 1, wherein the light dismiss manager exposes an application programming interface including a method that is called by the new light dismiss user interface surface before the new light dismiss user interface surface is opened.

8. The computing device of claim 7, wherein the application programming interface includes a callback method that is invoked to send a dismissal notification to the new light dismiss user interface surface when the input event is detected.

9. The computing device of claim 7, wherein the application programming interface includes a method that is called by the rendered user interface surface to register the event pass area.

10. A computer-implemented method for managing light dismiss behavior in an application user interface, the computer-implemented method comprising:

instantiating, by a computing device, a light dismiss manager for the application user interface;

receiving, by the light dismiss manager, a request to register an event pass area from a rendered user interface surface of the application user interface;

receiving, by the light dismiss manager, a notification that a new light dismiss user interface surface is to be opened in the application user interface;

determining, by the light dismiss manager, a shape of a transparent blocking panel that excludes the event pass area;

rendering the transparent blocking panel below the new light dismiss user interface surface when the new light dismiss user interface surface is opened in the application user interface, wherein the transparent blocking panel is configured to prevent execution of commands associated with visible portions of the application user interface that are outside of both the new light dismiss user interface surface and the event pass area; and closing the new light dismiss user interface surface and executing a command associated with a visible portion of the rendered user interface surface in response detecting an input event directed to the event pass area.

11. The computer-implemented method of claim 10, further comprising:

monitoring the application user interface for dismiss events including input events directed outside of the new light dismiss user interface surface and invocation of another light dismiss user interface surface that is not anchored to the new light dismiss user interface surface.

12. The computer-implemented method of claim 10, wherein executing the command comprises selecting a word in a document.

13. The computer-implemented method of claim 10, further comprising:

determining that the new light dismiss user interface surface is being invoked from an active light dismiss user interface surface;

keeping the active light dismiss user interface surface open when the new light dismiss user interface surface is opened; and closing the active light dismiss user interface surface together with the new light dismiss user interface surface in response to the input event.

14. The computer-implemented method of claim 10, wherein the rendered user interface surface is a ribbon comprising a tabbed set of toolbars.

15. The computer-implemented method of claim 10, wherein the event pass area is a custom exclusion zone inside of the transparent blocking panel.

16. The computer-implemented method of claim 10, wherein the transparent blocking panel excludes multiple event pass areas registered by multiple rendered user interface surfaces.

17. A computer-readable storage medium storing computer-executable instructions that, when executed by a computing device, cause the computing device to implement a light dismiss manager configured to:

receive a request to register an event pass area from a rendered user interface surface of an application user interface;

receive a notification that a new light dismiss user interface surface is to be opened in the application user interface;

exclude the event pass area from a transparent blocking panel that is to be rendered below the new light dismiss user interface surface when the new light dismiss user interface surface is opened in the application user interface;

monitor the application user interface for dismiss events when the new light dismiss user interface surface is open in the application user interface; and send a dismissal notification to the new light dismiss user interface surface in response to detecting an input event directed to the event pass area, wherein the input event passes through the transparent blocking panel and executes a command associated with a visible portion of the rendered user interface surface.

18. The computer-readable storage medium of claim 17, wherein the light dismiss manager is further configured to:
   determine that the new light dismiss user interface surface is being invoked from an active light dismiss user interface surface that is kept open when the new light dismiss user interface surface is opened; and
   send a dismissal notification to the active light dismiss user interface surface in response to the input event.

19. The computer-readable storage medium of claim 17, wherein the light dismiss manager is further configured to:
   determine that the new light dismiss user interface surface is not being invoked from an active light dismiss user interface surface; and
   send a dismissal notification to the active light dismiss user interface surface in response to the notification that the new light dismiss user interface surface is to be opened in the application user interface.

20. A computer-implemented method for managing light dismiss behavior in an application user interface, the computer-implemented method comprising:
   rendering a user interface surface providing a first plurality of commands each having an associated button, a transparent blocking panel that excludes the user interface surface, and a light dismiss manager user interface surface that overlays at least a portion of the transparent blocking panel, the light dismiss manager user interface providing a second command having a second associated button;
   receiving a click or touch on a location of the application user interface surface;
   responsive to determining that the location corresponds to a button within the user interface surface, executing a command of the user interface surface associated with the button within the user interface surface location;
   responsive to determining that the location corresponds to the second button within the light dismiss manager user interface surface, executing the second command of the light dismiss manager user interface surface associated with the second button location;
   responsive to determining that the location is not within the user interface surface and is not within the light dismiss manager user interface surface, preventing the click or touch from passing to an application of the application user interface.

* * * * *